United States Patent
Mo

(10) Patent No.: US 12,293,064 B2
(45) Date of Patent: May 6, 2025

(54) METHOD FOR DISPLAY-MODE SWITCHING, TERMINAL, AND STORAGE MEDIUM

(71) Applicant: GUANGDONG OPPO MOBILE TELECOMMUNICATIONS CORP., LTD., Guangdong (CN)

(72) Inventor: Boyu Mo, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 5 days.

(21) Appl. No.: 18/069,724

(22) Filed: Dec. 21, 2022

(65) Prior Publication Data
US 2023/0127743 A1    Apr. 27, 2023

Related U.S. Application Data

(63) Continuation of application No. PCT/CN2021/098160, filed on Jun. 3, 2021.

(30) Foreign Application Priority Data

Jul. 23, 2020 (CN) .......................... 202010719533.0

(51) Int. Cl.
*G06F 3/04842* (2022.01)
*G06F 3/0481* (2022.01)

(52) U.S. Cl.
CPC ........ *G06F 3/04842* (2013.01); *G06F 3/0481* (2013.01); *G06F 2203/04803* (2013.01)

(58) Field of Classification Search
CPC ............... G06F 3/04842; G06F 3/0481; G06F 2203/04803; G06F 3/0488; G06F 3/0482; G06F 3/04886; G06F 9/451; G06F 3/0484

See application file for complete search history.

(56) References Cited

U.S. PATENT DOCUMENTS

2015/0331593 A1*  11/2015  Lee .................. G06F 1/1641
                                                345/667
2018/0121082 A1*   5/2018  Zhu ................ G06F 3/04847

(Continued)

FOREIGN PATENT DOCUMENTS

CN    107368361    11/2017
CN    108540647     9/2018

(Continued)

OTHER PUBLICATIONS

WIPO, International Search Report and Written Opinion for International Application No. PCT/CN2021/098160, Aug. 26, 2021.

(Continued)

*Primary Examiner* — Pei Yong Weng

(74) *Attorney, Agent, or Firm* — Hodgson Russ LLP

(57) ABSTRACT

A method for display-mode switching, a terminal, and a storage medium are provided. The method includes the following. A first application-interface is displayed in a first display mode and a second application-interface is displayed in a second display mode. A switching operation for the first application-interface is received, where the switching operation indicates switching a display mode of an application-interface. In response to the switching operation, the second application-interface is displayed in the first display mode and the first application-interface is displayed in the second display mode, where an application-interface displayed in the first display mode has a smaller size than an application-interface displayed in the second display mode.

20 Claims, 11 Drawing Sheets

(56) References Cited

U.S. PATENT DOCUMENTS

2018/0284948 A1* 10/2018 Hao .................. G06F 3/0481
2020/0177726 A1   6/2020 Zhang
2022/0050582 A1*  2/2022 Zhou ................. G06F 3/0485

FOREIGN PATENT DOCUMENTS

| CN | 108920240  | 11/2018 |
| CN | 109271223  | 1/2019  |
| CN | 109445572  | 3/2019  |
| CN | 110531910  | 12/2019 |
| EP | 3825849    | 5/2021  |
| JP | H04333917  | 11/1992 |
| JP | 2002175141 | 6/2002  |
| JP | 2008217130 | 9/2008  |

OTHER PUBLICATIONS

CNIPA, First Office Action for CN Application No. 202010719533.0, Jun. 17, 2023.
EPO, Extended European Search Report for EP Application No. 21845357.9, Dec. 7, 2023.
CNIPA, Second Office Action for CN Application No. 202010719533.0, Dec. 26, 2023.
JPO, Office Action for JP Application No. 2023-503197, Mar. 12, 2024.
CNIPA, Rejection Decision for CN Application No. 202010719533.0, Apr. 19, 2024.

* cited by examiner

METHOD FOR DISPLAY-MODE SWITCHING, TERMINAL, AND STORAGE MEDIUM

CROSS-REFERENCE TO RELATED APPLICATION(S)

This application a continuation of International Application No. PCT/CN2021/098160, filed Jun. 3, 2021, which claims priority to Chinese Patent Application No. 202010719533.0, filed Jul. 23, 2020, the entire disclosures of which are incorporated herein by reference.

TECHNICAL FIELD

This application relates to the field of terminal technology, and in particular to a method for display-mode switching, a terminal, and a storage medium.

BACKGROUND

With the development of terminal technologies, more and more applications are installed in terminals. When using the applications, a user usually needs to switch between the applications.

For example, the user first uses a ride-hailing application to order a vehicle, and while waiting for the vehicle to arrive, the user switches to browse a news application. During browsing, the news application is in the foreground, while the ride-hailing application is switched to the background. When the user wants to check a specific location of the vehicle, the user needs to switch the ride-hailing application to the foreground and switch the news application to the background again.

SUMMARY

In one aspect, a method for display-mode switching is provided in implementations of the disclosure. The method includes the following. A first application-interface is displayed in a first display mode and a second application-interface is displayed in a second display mode. A switching operation for the first application-interface is received, where the switching operation indicates switching a display mode of an application-interface. In response to the switching operation, the second application-interface is displayed in the first display mode and the first application-interface is displayed in the second display mode, where an application-interface displayed in the first display mode has a smaller size than an application-interface displayed in the second display mode.

In another aspect, a terminal is provided in implementations of the disclosure. The terminal includes a processor and a memory storing at least one instruction, where the at least one instruction is configured to be executed by the processor to carry out the method of the above aspect.

In another aspect, a non-transitory computer-readable storage medium is provided in implementations of the disclosure. The computer-readable storage medium stores at least one instruction, where the at least one instruction is configured to be executed by a processor to carry out the method of the above aspect.

DETAILED DESCRIPTION

Figure 1:
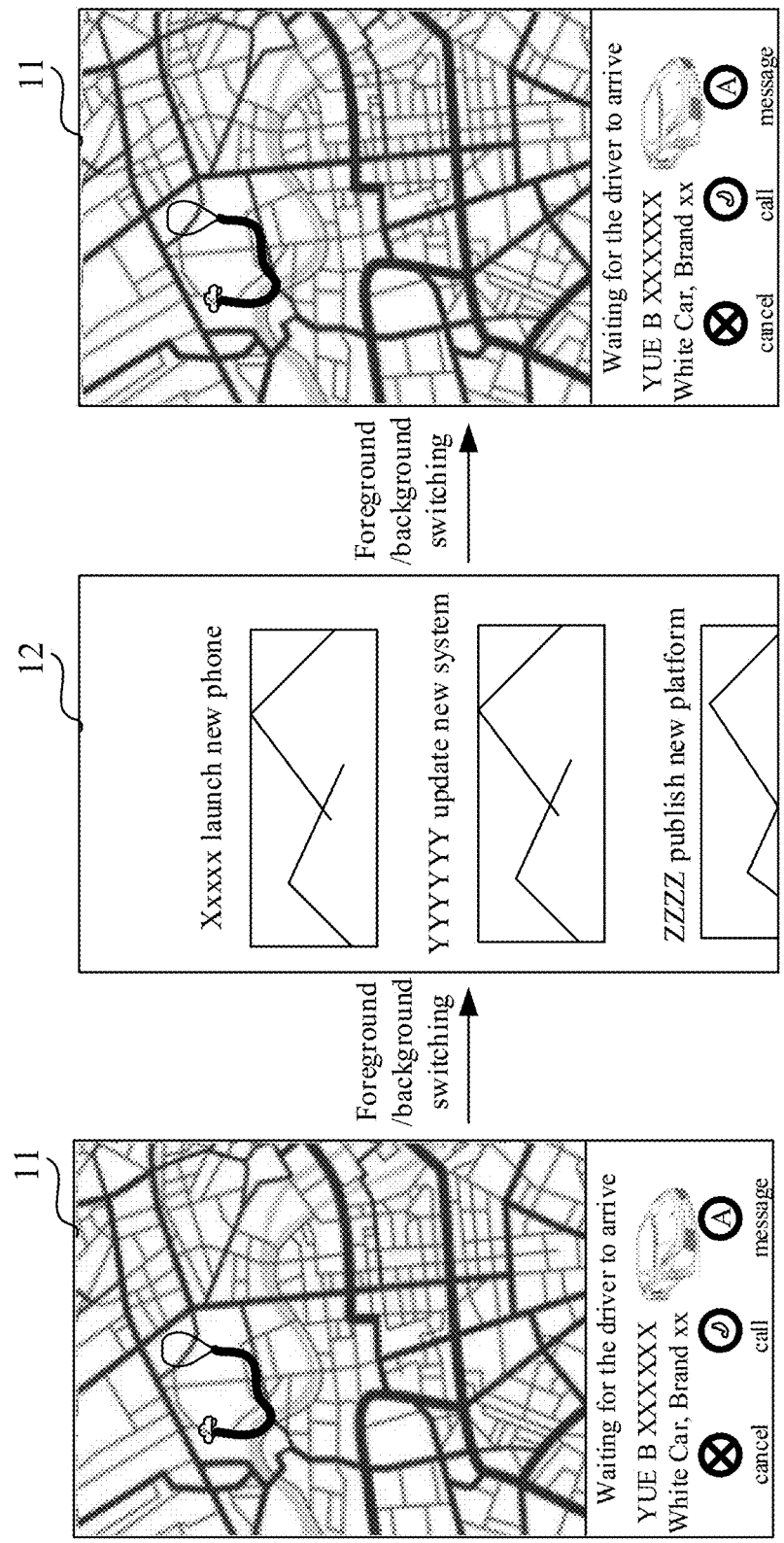
FIG. 1 is a schematic diagram illustrating interfaces during application switching in related arts.

In order to make the objectives, technical solutions and advantages of the disclosure clearer, implementations of the disclosure will be further described in detail below with reference to the accompanying drawings.

As used herein, the term "a plurality" refers to two or more. The term "and/or" describes an association relationship of the associated objects and means that there can be three kinds of relationships, for example, A and/or B can mean that A exists alone, A and B exist at the same time, and B exists alone. The character "/" generally indicates that the associated objects are an "or" relationship.

For ease of understanding, terms involved in the implementations of the disclosure will be described first.

First-type floating window: a type of floating window for displaying an application-interface. Optionally, the application-interface displayed in the first-type floating window is a downscaled application-interface, in which all interface elements of the application-interface are contained. Optionally, a core interface element(s) is displayed in the first-type floating window, where the core interface element is pre-configured by the application.

For example, for a ride-hailing application, a terminal downscales a ride-hailing interface displayed in full screen, so as to display the downscaled ride-hailing interface in the first-type floating window. For a recording application, the terminal extracts a recording time and a recording control (that is, core interface elements) in a recording-interface, so as to display only the recording time and the recording control in the first-type floating window.

Since this type of floating window generally has a small default size, in some possible implementations, the first-type floating window is only used for displaying the application-interface, and cannot respond to an in-application (in-app) operation(s) on the displayed application-interface. In other possible implementations, in addition to displaying the application-interface, the first-type floating window can also respond to the in-app operations. For example, when the first-type floating window displays the core interface element of the application-interface, a touch operation for the core interface element can be responded.

In some implementations, the first-type floating window may be displayed on a system main interface, an upper layer of a full-screen application-interface, or an upper layer of a split-screen application-interface. Two or more first-type floating windows can be displayed at the same time. In addition, the first-type floating window can be moved or scaled, that is, a user can adjust a display location or a display size of the first-type floating window as needed.

Second-type floating window: a type of floating window for displaying an application-interface. Compared to the first-type floating window, the second-type floating window has a larger default size. Optionally, in addition to displaying the application-interface, the second-type floating window can also respond to the in-app operations on the displayed application-interface. For example, when the second-type floating window displays a news-reading interface of a news application, the user may slide up or down the news-reading interface through a sliding operation. When the second-type floating window displays a recording interface of a recording application, the user may control a recording process by clicking a recording control in the recording interface. Optionally, the application-interface displayed in the second-type floating window is a downscaled application-interface.

In some implementations, the second-type floating window may be displayed on a system main interface, an upper layer of a full-screen application-interface, or an upper layer of a split-screen application-interface. Two or more second-type floating windows can be displayed at the same time. In implementations of the disclosure, the first-type floating window and the second-type floating window can be displayed at the same time. In addition, the second-type floating window can be moved or scaled, that is, the user may adjust a display location or a display size of the second-type floating window as needed.

In related arts, switching between multiple applications are achieved through a multitask-switching function. For example, as illustrated in FIG. 1, the user first uses a ride-hailing application to order a vehicle, and at this time the terminal displays a ride-hailing interface 11 in full screen. When waiting for the vehicle to arrive, the user switches the ride-hailing application to the background and opens a news application to read news, and at this time the terminal displays a news-reading interface 12 in full screen. When reading news, if the user wants to check a current location of the vehicle, the user needs to switch the news application to the background and switch the ride-hailing application to the foreground through the multitask-switching function (switching between the foreground and the background may be achieved through a multitask interface), and at this time the terminal displays the ride-hailing interface 11 in full screen again.

Apparently, when switching between applications are achieved in the above manner, since the terminal can only display the application-interface of a single application in full screen at a time, the user cannot view application information in application-interfaces before and after the switching at the same time. Therefore, it is necessary to frequently switch between foreground and background applications, causing a low application-switching efficiency.

Implementations of the disclosure provide a method for display-mode switching. With this method, the terminal may display a first application-interface with a switching requirement in a first display mode. When operates on a second application-interface (displayed in a second display mode), the user can view simultaneously application information in the first application-interface. If the user needs to perform in-app operation on the first application-interface, the user may perform a switching operation on the first application-interface to trigger the terminal to switch between display modes of the first and second application-interfaces, so as to display the first application-interface in a region with a larger size, which is convenient for the user to operate on the first application-interface. Meanwhile, since the second application-interface is displayed in the first display mode, after operations on the first application-interface are completed, the user may perform a switching operation on the second application-interface to switch again display modes of the first and second application-interfaces. As such, the applications can be switched efficiently.

The method for display-mode switching provided in the implementation of the disclosure can be used for a terminal with a touch screen. The terminal may be a smart phone, a tablet computer, a digital player, a smart wearable device, or a personal computer, etc., which are not limited in implementations of the disclosure.

Figure 2:
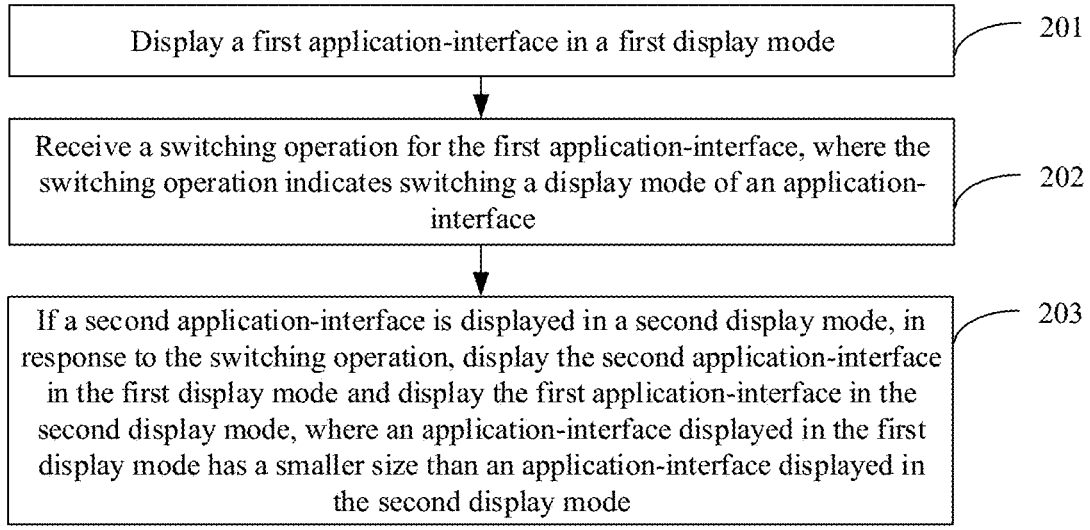
FIG. 2 is a flowchart of a method for display-mode switching provided in one example implementation of the disclosure.

Referring to FIG. 2, FIG. 2 is a flowchart of a method for display-mode switching provided in one example implementation of the disclosure. The method includes the following.

Step 201, a first application-interface is displayed in a first display mode.

In some implementations, the first display mode is a display mode other than a full-screen mode, such as a floating-window mode, a split-screen mode, etc.

In implementations of the disclosure, the first application-interface is a real-time application-interface. That is, changes of interface elements in the application will be displayed in the first application-interface in real time. For example, if the first application-interface is a navigation interface, during movement of a navigation object, a display location of the navigation object in a map in the navigation interface will change in real time.

Figure 3:
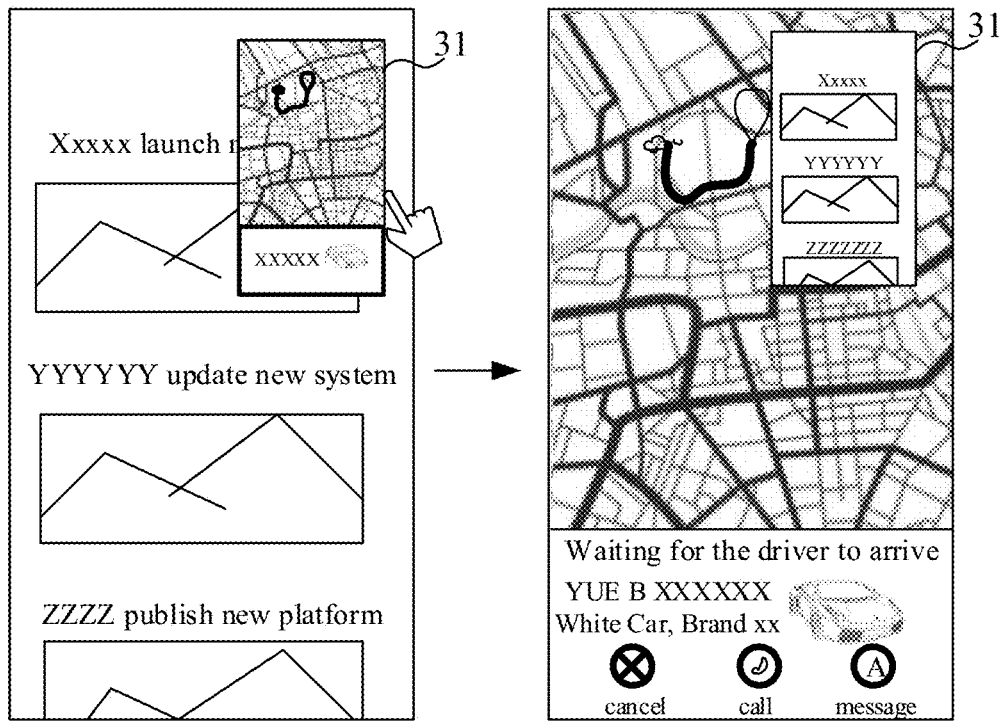
FIG. 3 is a schematic diagram illustrating interfaces during display-mode switching in another example implementation of the disclosure.

Exemplarily, as illustrated in FIG. 3, the terminal displays a ride-hailing interface of a ride-hailing application in a first-type floating window 31.

It should be noted that, a display location and a display size of the first application-interface may be adjusted as needed. For example, the user can change the display location of the first application-interface by dragging the first application-interface, and can change the display size of the first application-interface by stretching an interface edge of the first application-interface.

Step 202, a switching operation for the first application-interface is received, where the switching operation indicates switching a display mode of an application-interface.

Optionally, the switching operation may be a preset touch operation such as a single-click operation, a double-click operation, a press operation, a long-press operation, etc.

Optionally, the switching operation may be a preset gesture operation. Optionally, the switching operation may be a trigger operation for a display-mode switching control corresponding to the first application-interface. The type of the switching operation is not limited in implementations of the disclosure.

In implementations of the disclosure, the switching operation triggers switching the display mode of the first application-interface. After switching the display mode, the first application-interface has a larger size than before.

Exemplarily, as illustrated in FIG. 3, when a double-click operation on the ride-hailing interface in the first-type floating window 31 is received, the terminal determines that a switching operation is received.

Step 203, if a second application-interface is displayed in a second display mode, in response to the switching operation, the second application-interface is displayed in the first display mode and the first application-interface is displayed in the second display mode, where an application-interface displayed in the first display mode has a smaller size than an application-interface displayed in the second display mode.

In a possible implementation, after receiving the switching operation, the terminal checks existence of the second application-interface displayed in the second display mode. If there is the second application-interface displayed in the second display mode, the display mode of the second application-interface and the display mode of the first application-interface are switched. At this point, the second application-interface displayed in the second display mode is in the foreground. That is, before and after switching the display modes, the first and second application-interfaces are displayed at the same time, and the second application-interface has a larger size than the first application-interface.

The second application-interface needs to support the first display mode, and the first application-interface needs to support the second display mode, which will not be repeated herein.

Regarding the manner of switching the first application-interface and the second application-interface, in some implementations, the terminal obtains an original display region of the first application-interface and an original display region of the second application-interface, so as to display the first application-interface in the original display region of the second application-interface, and displays the second application-interface in the original display region of the first application-interface.

Exemplarily, as illustrated in FIG. 3, when receiving the double-clicking operation on the ride-hailing interface, the terminal determines the news-reading interface displayed in full screen as the second application-interface, and then displays the news-reading interface in the first-type floating window 31 and displays the ride-hailing interface in full screen.

As can be seen, with the solution provided in implementations of the disclosure, the user can switch between application-interfaces through a simple switching operation. In this way, the efficiency of application switching can be improved, and at the same time the problem that the application process being switched may be closed and thus require restart in related arts can be avoided.

In a possible implementation, if there is no second application-interface displayed in the second display mode, the terminal will not respond to the switching operation. For example, if the first application-interface is in the system main interface, that is, no other application is displayed in the foreground, the terminal does not respond to the switching operation. Optionally, if other application-interfaces displayed in the foreground do not support the first display mode, or the first application-interface does not support the second display mode corresponding to the application displayed in the foreground, the terminal will not respond to the switching operation.

In other possible implementations, if there is no second application-interface displayed in the second display mode, the terminal responses in a manner other than switching the display mode. For example, if the first application-interface is in the system main interface, that is, no other application is displayed in the foreground, the terminal will display the first application-interface in full screen according to the switching operation.

Optionally, if there is no second application-interface displayed in the second display mode, the terminal will display prompt information to indicate to the user under which cases the interface switching can be done through the switching operation.

In summary, in implementations of the disclosure, when the first application-interface is displayed, if there is the second application-interface displayed in a different display mode from the first application-interface exists and having a larger size than the first application-interface, the user may trigger the terminal to switch between display modes of the first and the second application-interfaces by performing the switching operation on the first application-interface. In this way, the user can continue to view contents of the second application-interface while viewing the first application-interface in a larger display region, which helps to improve the efficiency of switching between applications in a multi-application usage scenario.

Optionally, if the second application-interface is displayed in the second display mode, in response to the switching operation, the second application-interface is displayed in the first display mode and the first application-interface is displayed in the second display mode as follows.

If at least two second application-interfaces are displayed in the second display mode, a target application-interface is determined from the at least two second application-interfaces. In response to the switching operation, the target application-interface is displayed in the first display mode and the first application-interface is displayed in the second display mode.

Optionally, the first display mode is a first floating-window mode, and the second display mode includes at least one of a full-screen mode, a second floating-window mode, or a split-screen mode. In the first floating-window mode, an application-interface is displayed in a first-type floating window, and in the second floating-window mode, an application-interface is displayed in a second-type floating window, where the first-type floating window has a size smaller than the second-type floating window.

Optionally, the second display mode is the full-screen mode.

The target application-interface is determined from the at least two second application-interfaces as follows. A second application-interface displayed in full screen is determined as the target application-interface.

The second application-interface is displayed in the first display mode and the first application-interface is displayed in the second display mode as follows. The first application-interface is displayed in full screen and the target application-interface is displayed in the first-type floating window.

Optionally, the second display mode is the second floating-window mode.

The target application-interface is determined from the at least two second application-interfaces as follows. A latest usage moment of an application in each second-type floating window is obtained. A second-type floating window corresponding to a latest usage moment closest to a current time is determined as a target second-type floating window. The second application-interface displayed in the target second-type floating window is determined as the target application-interface.

Alternatively, a switching option corresponding to each second-type floating window is displayed. In response to an operation for selecting a target switching option from at least two switching options, the second-type floating window corresponding to the target switching option is determined as a target second-type floating window. The second application-interface displayed in the target second-type floating window is determined as the target application-interface.

The second application-interface is displayed in the first display mode and the first application-interface is displayed in the second display mode as follows. The first application-interface is displayed in the target second-type floating window and the target application-interface is displayed in the first-type floating window.

Optionally, the second display mode comprises the full-screen mode and the second floating-window mode.

The target application-interface is determined from the at least two second application-interfaces as follows. The second application-interface displayed in full screen is determined as the target application-interface. A switching option corresponding to each second application-interface is displayed, and in response to a selecting operation for a target switching option in the switching options, the second application-interface corresponding to the target switching option is determined as the target application-interface.

The second application-interface is displayed in the first display mode and the first application-interface is displayed in the second display mode as follows. In response to the target application-interface being the second application-interface displayed in full screen, the first application-interface is displayed in full screen and the target application-interface is displayed in the first-type floating window. In response to the target application-interface being the second application-interface displayed in the second floating-window mode, the first application-interface is displayed in the second-type floating window and the target application-interface is displayed in the first-type floating window.

Optionally, the second display mode is the split-screen mode.

The target application-interface is determined from the at least two second application-interfaces as follows. A target split-screen region where the first-type floating window is located is determined. The second application-interface located in the target split-screen region is determined as the target application-interface. Alternatively, a switching option corresponding to each second application-interface is displayed, and in response to a selecting operation for a target switching option in the switching options, the second application-interface corresponding to the target switching option is determined as the target application-interface.

The second application-interface is displayed in the first display mode and the first application-interface is displayed in the second display mode as follows. The first application-interface is displayed in a split-screen region corresponding to the target application-interface and the target application-interface is displayed in the first-type floating window.

Optionally, after displaying the target application-interface in the first display mode and displaying the first application-interface in the second display mode, the method further includes the following. A switching operation for the target application-interface is received. In response to the switching operation, the first application-interface is displayed in the first display mode and the target application-interface is displayed in the second display mode, if there is no second application-interface other than the target application-interface.

Optionally, after receiving the switching operation for the target application-interface, the method further includes the following. If there is at least one second application-interface other than the target application-interface, a time interval between two adjacent switching operations is obtained. When the time interval is greater than an interval threshold or when an interface operation for the first application-interface is received within the time interval, in response to the switching operation, the first application-interface is displayed in the first display mode and the target application-interface is displayed in the second display mode. When the time interval is smaller than the interval threshold and no interface operation for the first application-interface is received within the time interval, a candidate application-interface is determined from the at least one second application-interface other than the target application-interface, and in response to the switching operation, the display modes are restored, and the candidate application-interface displayed in the first display mode and the first application-interface is displayed in the second display mode.

In a possible implementation, when the first application-interface is displayed, if at least two second application-interface is displayed in the second display mode, the terminal determines a target application-interface from the at least two second application-interfaces. Then in response to the switching operation, the terminal displays the target application-interface in the first display mode and displays the first application-interface in the second display mode, thus achieve switching of the display mode.

Optionally, when the first display mode of the first application-interface is a first floating-window mode, the first application-interface is displayed in the first-type floating window. Correspondingly, an application-interface displayed in a full-screen mode, a second floating-window mode, or a split-screen mode can be regarded as the second application-interface that satisfies a switching condition. For the second floating-window mode, the application-interface is displayed in a second-type floating window, where the first-type floating window has a smaller size than the second-type floating window.

In some implementations, the second application-interface displayed in the terminal may include at least one of:
1. a full-screen application-interface;
2. at least one floating-window application-interface (displayed in the second-type floating window);
3. a full-screen application-interface and at least one floating-window application-interface; or
4. at least two split-screen application-interfaces.

In the following, a process of determining a target application-interface and switching the display mode will be described for the above cases by way of examples.

Figure 4:
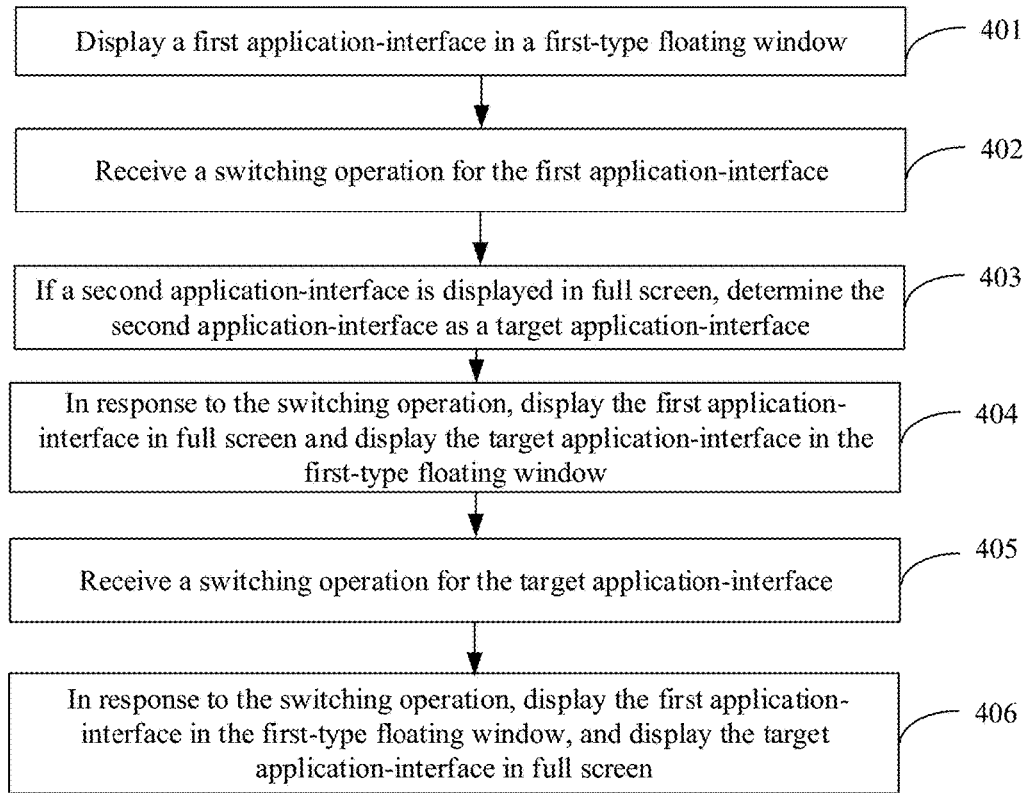
FIG. 4 is a flowchart of a method for display-mode switching provided in another example implementation of the disclosure.

Referring to FIG. 4, FIG. 4 is a flowchart of a method for display-mode switching provided in another example implementation of the disclosure. The method may include the following.

Step 401, a first application-interface is displayed in a first-type floating window.

Step 402, a switching operation for the first application-interface is received.

For implementations of steps 401 and 402, reference may be made to steps 201 and 202, which will not be repeated herein.

Step 403, if a second application-interface is displayed in full screen, the second application-interface is determined as a target application-interface.

When the first application-interface is displayed, if there is a full-screen application (that is, an application corresponding to the second application-interface), the terminal will determine the second application-interface as the target application-interface that satisfies the switching condition, and then switch the display modes of the first application-interface and the second application-interface.

Figure 5:
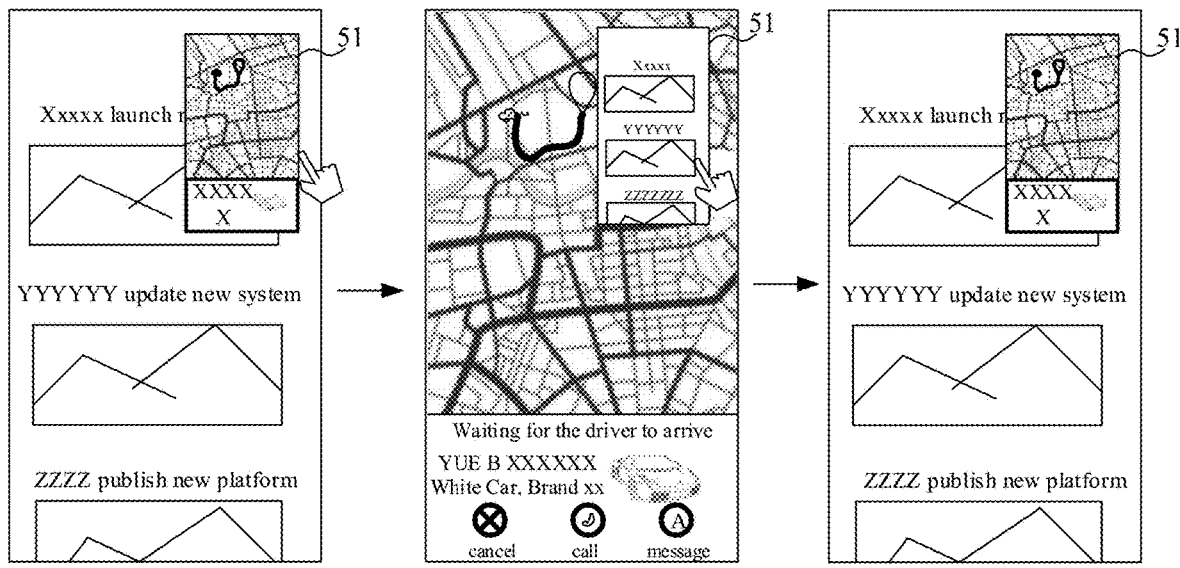
FIG. 5 is a schematic diagram illustrating interfaces during display-mode switching in another example implementation of the method for display-mode switching illustrated in FIG. 4.

Exemplarily, as illustrated in FIG. 5, the terminal displays a ride-hailing interface of a ride-hailing application in a first-type floating window 51, and at the same time displays a news-reading interface of a news application in full screen. When receiving a double-click operation for the ride-hailing interface, the terminal determines the news-reading interface as the target application-interface.

Step 404, in response to the switching operation, the first application-interface is displayed in full screen and the target application-interface is displayed in the first-type floating window.

When switching the display modes of the first application-interface and the target application-interface, the terminal displays the first application-interface in full screen, and displays the target application-interface in the first-type floating window. After switching the display modes, the user can perform an in-app operation on the first application-interface displayed in full screen, and at the same time can view contents of the target application-interface in the first-type floating window.

Exemplarily, as illustrated in FIG. 5, after receiving the double-click operation on the first-type floating window 51, the terminal displays the ride-hailing interface in full screen, and display the news-reading interface in the first-type floating window 51.

Step 405, a switching operation for the target application-interface is received.

After the user completes viewing the first application-interface or completes the in-app operation on the first application-interface, the user may need to switch interfaces again so as to continue an in-app operation on the target application-interface. In this case, the user may perform a switching operation on the target application-interface in the first display mode, to trigger another switching of the application-interface.

Exemplarily, as illustrated in FIG. 5, when receiving a double-click operation on the news-reading interface in the first-type floating window 51, the terminal determines that the display modes of the ride-hailing interface and the news-reading interface need to be switched again.

Step 406, in response to the switching operation, the first application-interface is displayed in the first-type floating window, and the target application-interface is displayed in full screen.

Since there is no other second application-interface than the target application-interface, the terminal determines that the switching operation is intended to switch the display modes of the first application-interface and the target application-interface. Therefore the terminal displays the first application-interface in the first-type floating window, and displays the target application-interface in full screen.

Exemplarily, as illustrated in FIG. 5, after receiving the double-click operation on the first-type floating window 51, the terminal redisplays the ride-hailing interface in the first-type floating window 51, and redisplays the news-reading interface in full screen.

Through the switching operation on the first-type floating window, the user can toggle between the display modes of the full-screen application and the application in the first-type floating window, which improves the efficiency of switching between applications.

Figure 6:
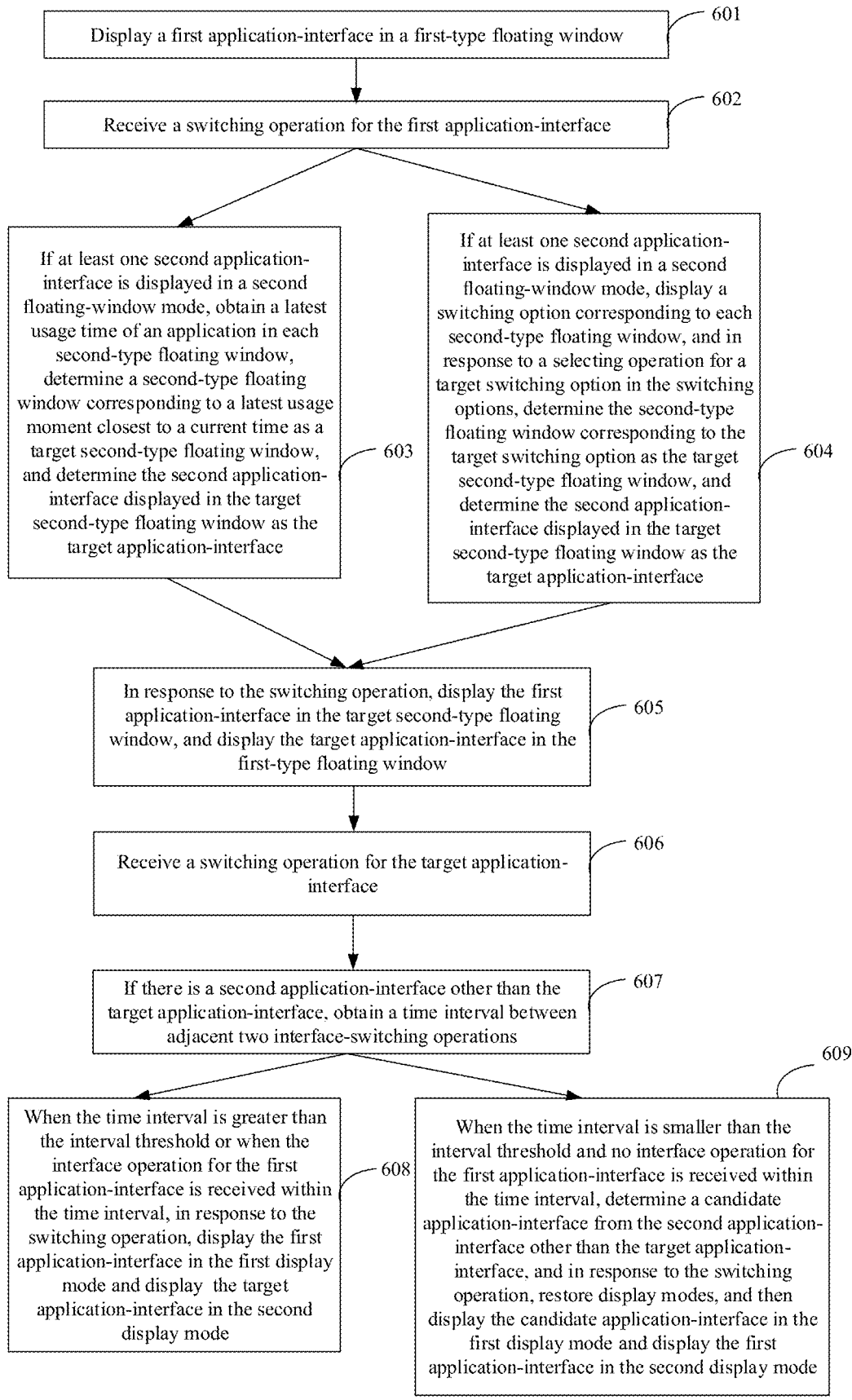
FIG. 6 is a flowchart of a method for display-mode switching provided in another example implementation of the disclosure.

Referring to FIG. 6, FIG. 6 is a flowchart of a method for display-mode switching provided in another example implementation of the disclosure. The method may include the following.

Step 601, a first application-interface is displayed in a first-type floating window.

Step 602, a switching operation for the first application-interface is received.

For implementations of steps 601 and 602, reference may be made to steps 201 and 202, which will not be repeated herein.

Step 603, if at least two second application-interfaces are displayed in a second floating-window mode, a latest usage moment of an application in each second-type floating window is obtained. A second-type floating window corresponding to a latest usage moment closest to a current time is determined as a target second-type floating window. The second application-interface displayed in the target second-type floating window is determined as the target application-interface.

In a possible implementation, if at least two second-type floating windows are displayed while the first-type floating window is displayed, the terminal determines that there is a second application-interface that satisfies the switching condition. Further, if there is one second-type floating window, the terminal determines the second application-interface displayed in the second-type floating window as the target application-interface, and if there are at least two second-type floating windows, according to a preset switching logic, the terminal determines the target application-interface from the second application-interfaces displayed in the at least two second-type floating windows.

Figure 7:
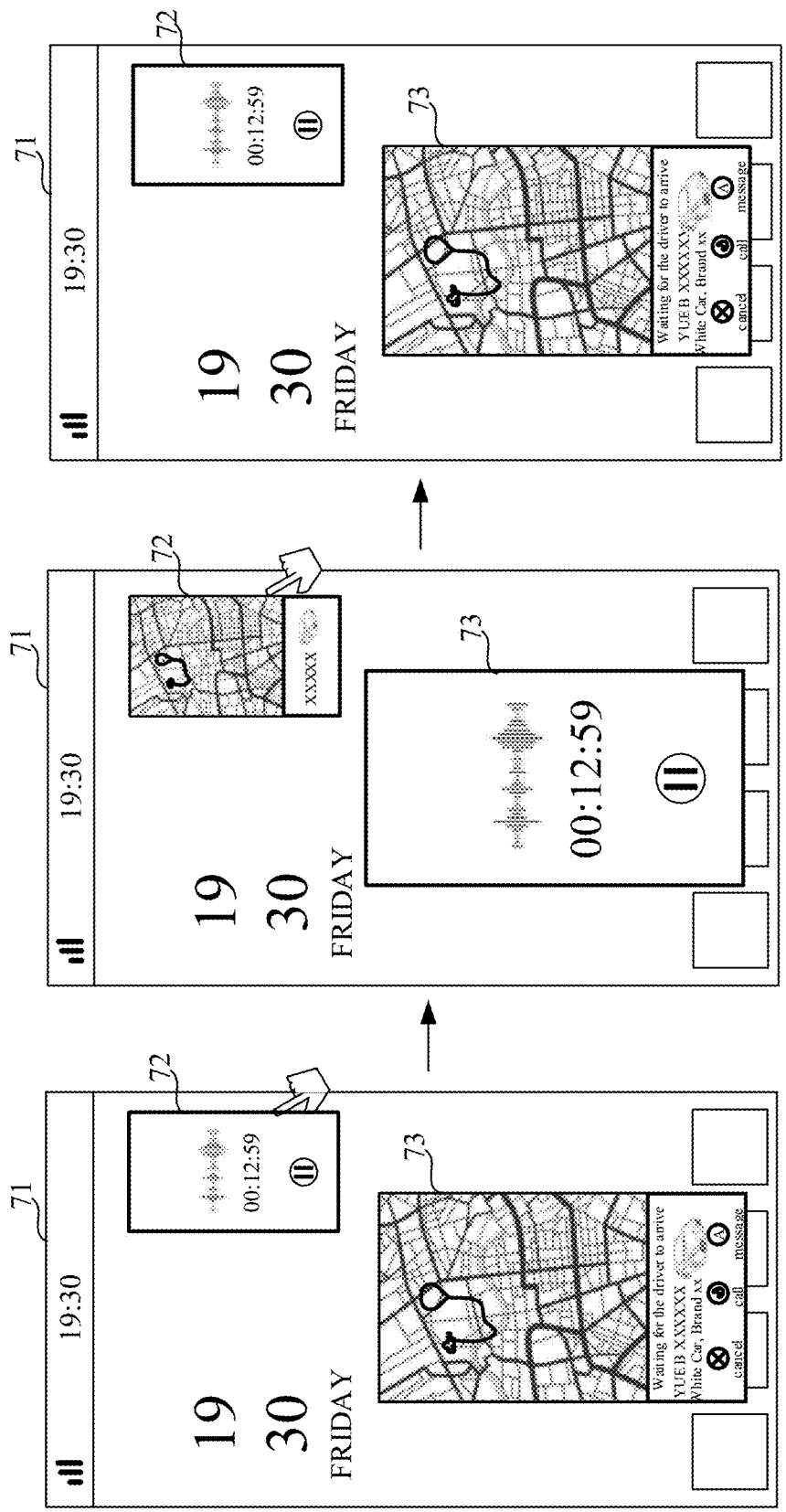
FIG. 7 to FIG. 9 are schematic diagrams illustrating interfaces during display-mode switching in example implementations of the method for display-mode switching illustrated in FIG. 4.

Exemplarily, as illustrated in FIG. 7, a first-type floating window 72 and a second-type floating window 73 are displayed over a system main interface 71, where a recording interface of a recording application is displayed in the first-type floating window 72, and a ride-hailing interface of a ride-hailing application is displayed in the second-type floating window 73. When receiving a double-click operation on the first-type floating window 72, the terminal determines the ride-hailing interface as the target application-interface.

In a possible implementation, since the user usually switches between two recently-used applications, when there are at least two second-type floating windows, the terminal obtains latest usage moments of the applications corresponding to respective second-type floating windows, and determines a time interval between each of the latest usage moments and the current time. A second-type floating window corresponding to the minimum time interval will be determined as a target second-type floating window, and the second application-interface displayed in the target second-type floating window will be determined as the target application-interface. The latest usage moment of the application in each second-type floating window may be obtained from a task stack, which is not limited in implementations of the disclosure.

In an example, the current time is 10:00:00. If there are two second-type floating windows displayed over the system main interface, and the latest usage moments of the corresponding applications are 9:59:50 and 9:58:00, the terminal determines the floating-window application with the latest usage moment 9:59:50 as the target application (the application-interface corresponding to the target application is the target application-interface).

Step 604, if at least two second application-interfaces are displayed in second-type floating windows, a switching option corresponding to each second-type floating window is displayed, and in response to a selecting operation for a target switching option in the switching options, the second-type floating window corresponding to the target switching option is determined as the target second-type floating window, and the second application-interface displayed in the target second-type floating window is determined as the target application-interface.

In addition to determining the target application-interface based on the latest usage moments, in order to further improve an accuracy of application switching, in a possible implementation, when the switching operation is received and at least two second-type floating windows is displayed, the terminal displays a switching option(s) each corresponding to a second-type floating window (i.e., each second application-interface). The switching option may be displayed at an edge of the first-type floating window. The switching option may be in the form of a control such as a button. The form and position of the displayed switching option are not limited in implementations of the disclosure.

Correspondingly, when receiving an operation for selecting the target switching option from the at least two switching options, the terminal determines the second-type floating window corresponding to the target switching option as the target second-type floating window.

Figure 8:
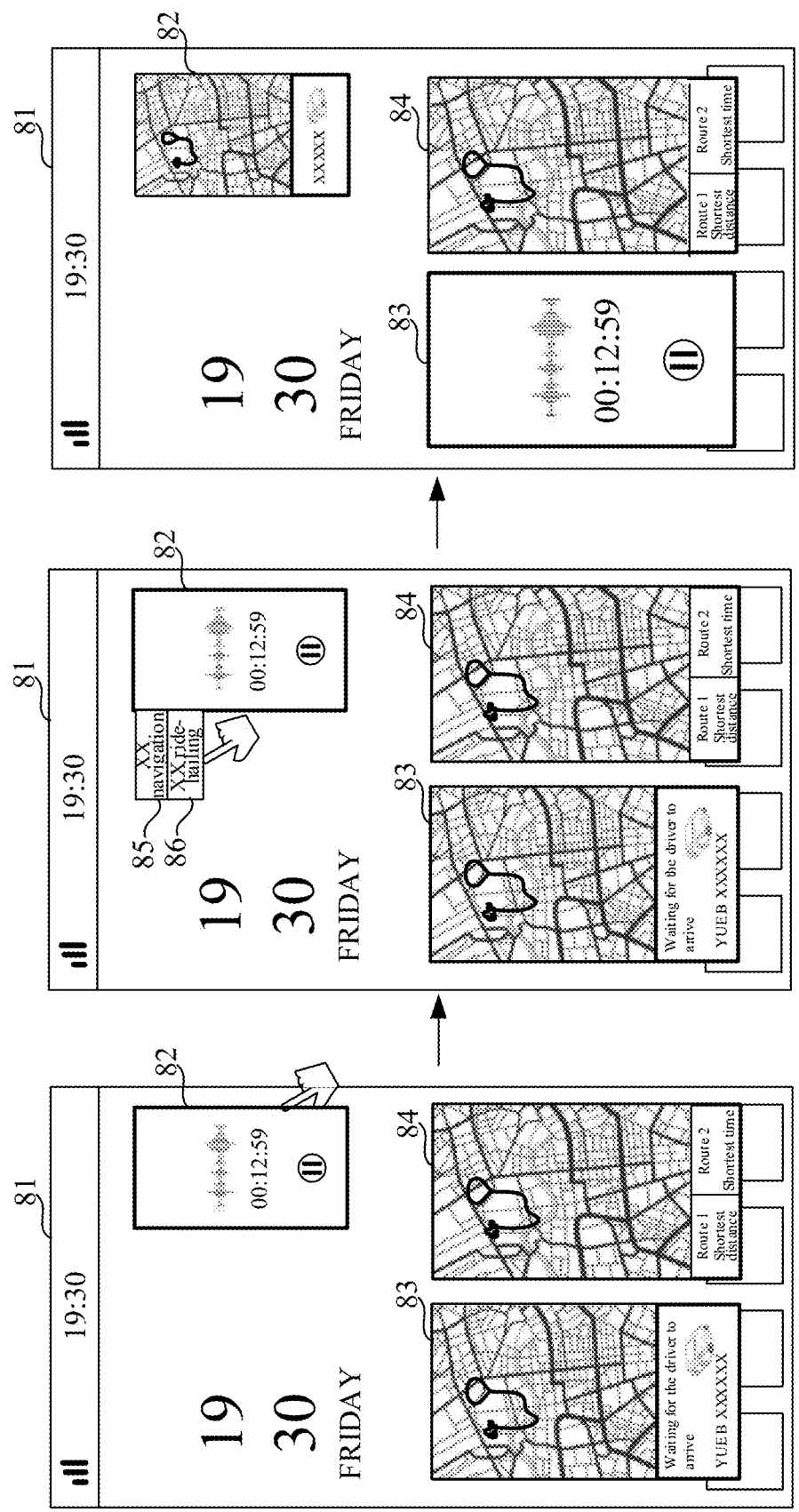

Exemplarily, as illustrated in FIG. 8, a first-type floating window 82, a second-type floating window 83, and a second-type floating window 84 are displayed over a system main interface 81, where a recording interface of a recording application is displayed in the first-type floating window 82, a ride-hailing interface of a ride-hailing application is displayed in the second-type floating window 83, and a navigation interface of a navigation application is displayed in the second-type floating window 84. When receiving a double-click operation on the first-type floating window 82, the terminal displays a first switching option 85 corresponding to the navigation application and a second switching option 86 corresponding to the ride-hailing application on the left side of the first-type floating window 82. Further, when receiving a click operation on the second switching option 86, the terminal determines the ride-hailing application as the target application.

In addition to the above two manners of determining the target application, in other possible implementations, the terminal may also determine the target application according to a historical application-switching record between the first application (the application to which the first application-interface corresponds) and each second application (the second application to which the second application-interface corresponds). A second application with the highest frequency of switching with the first application in the historical application-switching record is determined as the target application. Optionally, a second application associated with the first application is determined as the target application. Then the target application-interface is determined based on the target application. The manners of determining the target application are not limited herein.

Step 605, in response to the switching operation, the first application-interface is displayed in the target second-type floating window, and the target application-interface is displayed in the first-type floating window.

Further, the terminal displays the first application-interface in the target second-type floating window, and displays the target application-interface in the first-type floating window. It should be noted that in this implementation, the first application-interface exemplarily can be displayed in the second-type floating window. If the first application-interface cannot be displayed in the second-type floating window, the terminal will not respond to the switching operation.

Exemplarily, as illustrated in FIG. 7, according to the interface switching operation, the terminal displays the recording interface in the second-type floating window 73 and displays the ride-hailing interface in the first-type floating window 72. As illustrated in FIG. 8, according to the selecting operation of the switching option, the terminal displays the recording interface in the second-type floating window 83 and displays the ride-hailing interface in the first-type floating window 82.

Step 606, a switching operation for the target application-interface is received.

For implementations of step 606, reference may be made to step 405 above, which will not be repeated herein.

If there is only one second-type floating window, the terminal will switch again the display modes of the first application-interface and the target application-interface. Exemplarily, as illustrated in FIG. 7, when receiving a double-click operation on the first-type floating window 72 again, the terminal determines that the display modes of the ride-hailing interface and the recording interface need to be switched again, so that the terminal redisplays the recording interface in the first-type floating window 72, and redisplays the ride-hailing interface in the second-type floating window 73.

If there are at least two second-type floating windows, in addition to instructing to switch back to the original display modes, the switching operation on the first-type floating windows may also instruct to switch to the display mode of another second-type floating window. Therefore, when there are at least two second-type floating windows, after receiving the switching operation for the first-type floating window, the terminal needs to further determine an intention of the switching operation.

Step 607, if there is a second application-interface other than the target application-interface, a time interval between two adjacent switching operations is obtained.

Generally, when the display mode matches user expectations, the user will perform in-app operations on the first application-interface, or switch the display mode again after maintaining the current display mode for a period of time. When the display mode does not match the user expectations, the user will not perform in-app operations on the application-interface, and will switch the display mode again in a short time. Therefore, in a possible implementation, the terminal may determine the time interval between two adjacent switching operations, and then determine the actual intention of the switching operation according to the length of the time interval and the user operation on the first application-interface within the time interval.

Optionally, each time a switching operation is received, the terminal records the time of the switching operation. When receiving the switching operation again, the terminal determines the time interval from the last switching operation. The terminal detects whether the time interval is greater than an interval threshold, and detects whether an interface operation on the first application-interface is received within the time interval. If the time interval is greater than the interval threshold, or an interface operation on the first application-interface is received within the time interval, proceeds to the following step 608. If the time interval is less than the interval threshold, and no operation for the first application-interface is received within the time interval, proceeds to the following step 609.

Step 608, when the time interval is greater than the interval threshold or when the interface operation for the first application-interface is received within the time interval, in response to the switching operation, the first application-interface is displayed in the first display mode and the target application-interface is displayed in the second display mode.

When the time interval is greater than the interval threshold, or when the interface operation on the first application-interface is received within the time interval, it indicates that the last switching matches the user expectation. Therefore, the terminal determines that the switching operation received this time is intended for restoring the display modes of the first application-interface and the target application-interface, so the terminal redisplays the first application-interface in the first-type floating window and redisplays the target application-interface in the second-type floating window.

For example, the interval threshold may be 5 s, 10 s, 15 s, etc., which is not limited herein.

Figure 9:
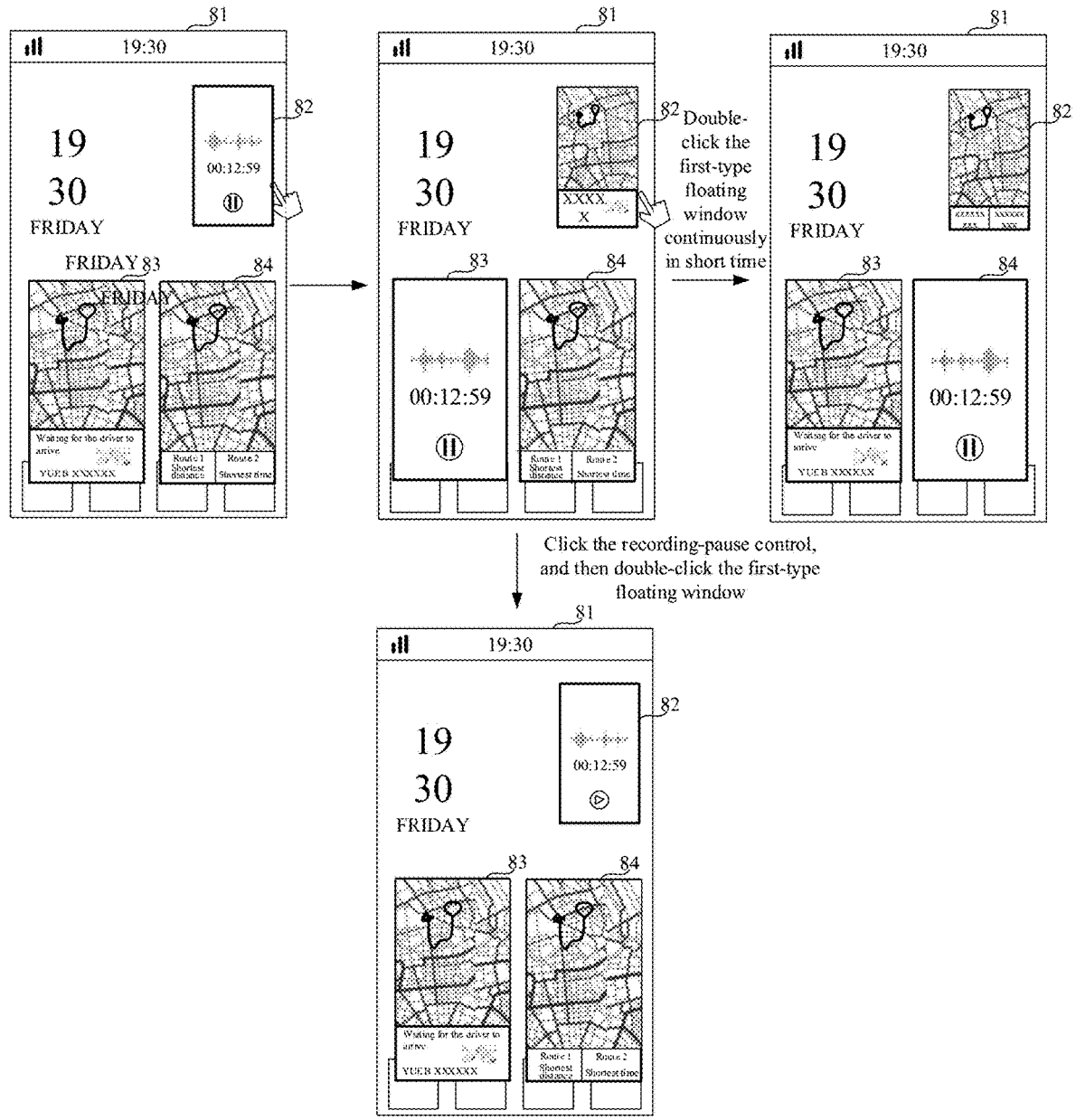

Exemplarily, as illustrated in FIG. 9, a first-type floating window 82, a second-type floating window 83, and a second-type floating window 84 are displayed over a system main interface 81, where a recording interface of a recording application is displayed in the first-type floating window 82, a ride-hailing interface of a ride-hailing application is displayed in the second-type floating window 83, and a navigation interface of a navigation application is displayed in the second-type floating window 84. When receiving a double-click operation on the first-type floating window 82, the terminal determines the ride-hailing application as the target application, and then displays the ride-hailing application in the first-type floating window 82 and displays the recording interface in the second-type floating window 83. After interface switching, the user clicks a recording-pause control in the recording interface, and double-clicks again the first-type floating window 82. Since the interface operation is performed on the recording application (i.e., the first application) between two adjacent switching operations, according to the interface switching operation received this time, the terminal redisplays the recording interface in the first-type floating window 82 and redisplays the ride-hailing interface of the ride-hailing application in the second-type floating window 83 again.

Step 609, when the time interval is smaller than the interval threshold and no interface operation for the first application-interface is received within the time interval, a candidate application-interface is determined from the second application-interface other than the target application-interface, and in response to the switching operation, display modes are restored, and then the candidate application-interface is displayed in the first display mode and the first application-interface is displayed in the second display mode.

That is, in response to the switching operation, display modes of the first application-interface and the second application-interface are restored, and then the candidate application-interface is displayed in the first display mode and the first application-interface is displayed in the second display mode corresponding to the candidate application-interface.

When the time interval is less than the interval threshold and no interface operation for the first application-interface is received within the time interval (that is, switching operation for the first-type floating window are continuously received), it indicates that the last interface switching does not match the user expectations, so the terminal determines that the switching operation received this time is for triggering to switch again the display mode.

In a possible implementation, the terminal determines the candidate application-interface from the second application-interface other than the target application-interface, and restores to the original display modes (which can be realized by canceling the response to the last switching operation). Thereafter, the terminal displays the first application-interface in the second-type floating window corresponding to the candidate application-interface, and displays the candidate application-interface in the first-type floating window.

Exemplarily, as illustrated in FIG. 9, when the user double-clicks the first-type floating window 82 continuously in a short time, it indicates that last adjustment of the display modes by the terminal does not match expectations, so that the display modes are restored, and the navigation interface is displayed in the first-type floating window 82, and the recording interface is displayed in the second-type floating window 84.

In this implementation, when the first application-interface is displayed in the first-type floating window and at least two second-type floating windows are displayed, if the switching operation for the first-type floating window is received, according to the latest usage moments of the second-type floating windows or according to the switching options corresponding to the second-type floating windows, the target second-type floating window is determined for switching the display mode, which helps to improve the accuracy of interface switching. When the switching operations are continuously received, the terminal determines to restore the original display modes or switch the display modes again according to the time interval and the interface operation on the first application within the time interval, which further improves the accuracy of the interface switching.

Figure 10:
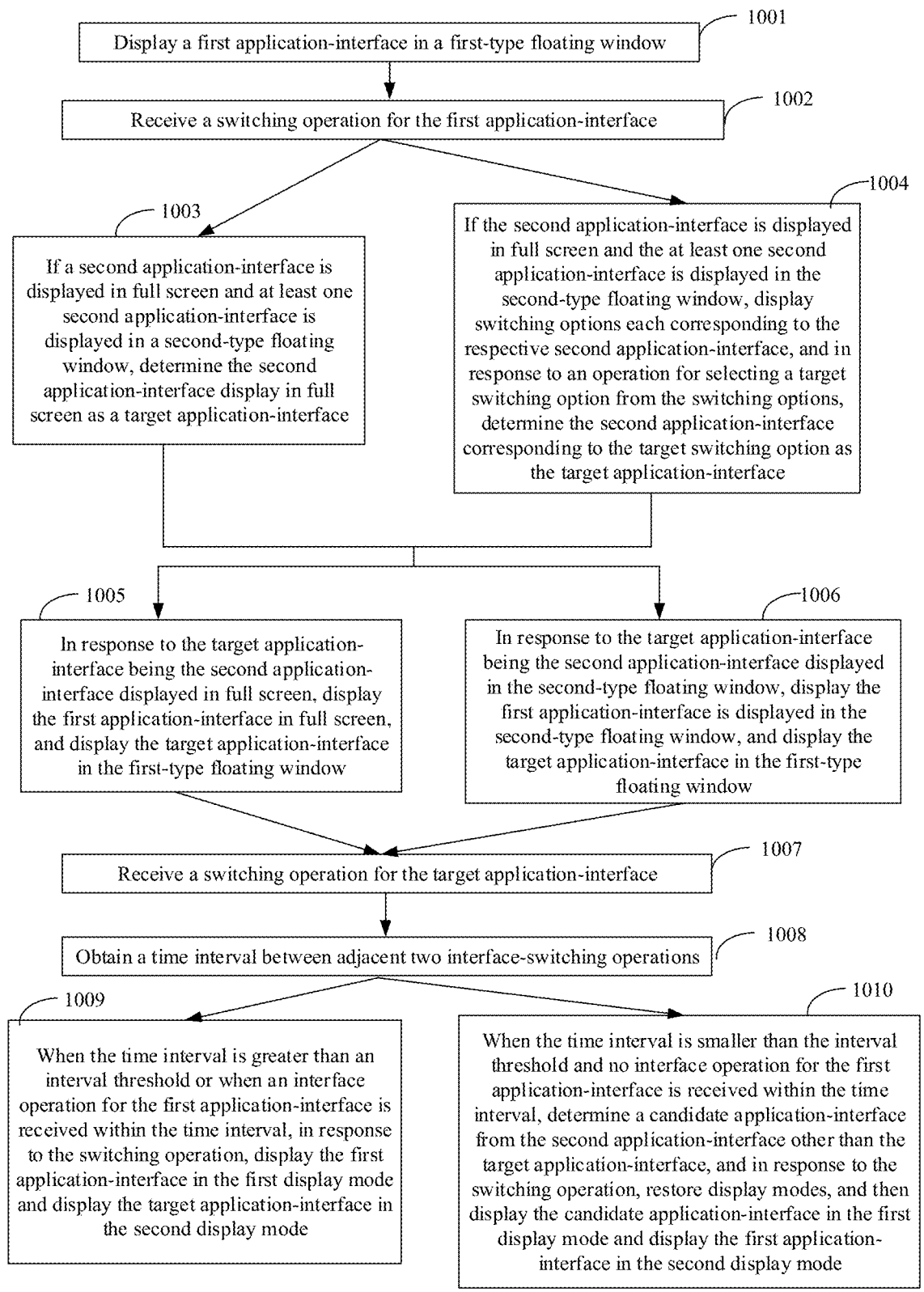
FIG. 10 is a flowchart of a method for display-mode switching provided in another example implementation of the disclosure.

Referring to FIG. 10, FIG. 10 is a flowchart of a method for display-mode switching provided in another example implementation of the disclosure. The method may include the following.

Step 1001, a first application-interface is displayed in a first-type floating window.

Step 1002, a switching operation for the first application-interface is received.

For implementations of the steps 1001 and 1002, reference may be made to steps 201 and 202, which will not be repeated herein.

Step 1003, if a second application-interface is displayed in full screen and at least one second application-interface is displayed in a second-type floating window, the second application-interface display in full screen is determined as a target application-interface.

In a possible implementation, the terminal determines the full-screen application as a default application for switching with the application in the first-type floating window. Therefore, when the full-screen application and the at least one application displayed in the second-type floating window are displayed, the terminal preferentially determines the full-screen application as the target application.

In other possible implementations, the terminal may also determine the application displayed in the second-type floating window as the default application for interface switching with the application in the first-type floating window. Correspondingly, the terminal preferentially determines the target application from the applications displayed in the second-type floating windows (for the method of determining the target application, reference may be made to the above).

Step 1004, if the second application-interface is displayed in full screen and the at least one second application-interface is displayed in the second-type floating window, switching options each corresponding to the respective second application-interface are displayed, and in response to a selecting operation for a target switching option in the switching options, the second application-interface corresponding to the target switching option is determined as the target application-interface.

In order to further improve an accuracy of application-switching, in another possible implementation, when the switching operation is received, and the full-screen application and at least one floating window application are displayed, the terminal displays the switching options each corresponding to the respective application. The switching options may be displayed at an edge of the first-type floating window, and the switching options may be in the form of a control such as a button. The form and position of the displayed switching options are not limited in implementations of the disclosure.

Correspondingly, when receiving the operation for selecting the target switching option from the at least two switching options, the terminal determines the application corresponding to the target switching option as the target application. The target application may be a full-screen application or a floating window application.

In addition to determining the target application through the above two manners, in other possible implementations, the terminal may also determine the target application according to a historical application-switching record between the first application and each second application. The second application with the highest frequency of switching with the first application in the historical application-switching record is determined as the target application. Optionally, the second application associated with the first application is determined as the target application. Optionally, the second application most-recently-used is determined as the target application according to the latest usage moments of respective second applications. The manner of determining the target application is not limited herein.

Step 1005, in response to the target application-interface being the second application-interface displayed in full screen, the first application-interface is displayed in full screen, and the target application-interface is displayed in the first-type floating window.

When the determined target application is the full-screen application, the terminal displays the first application-interface in full screen, and displays the target application-interface in the first-type floating window. The manner of switching display modes may refer to FIG. 5.

Step 1006, in response to the target application-interface being the second application-interface displayed in the second-type floating window, the first application-interface is displayed in the second-type floating window, and the target application-interface is displayed in the first-type floating window.

When the determined target application is the floating-window application, the terminal displays the first application-interface in the second-type floating window, and displays the target application-interface in the first-type floating window. The manner of switching display modes may refer to FIG. 7.

Step 1007, a switching operation for the target application-interface is received.

For implementations of step 1007, reference may be made to the step 405 above, which will not be repeated herein.

Since there are at least two switchable second application-interfaces (that is, application interfaces of the full screen application and the at least one floating-window application), the switching operation on the target application-interface may be intended for restore the original display modes or switching with another second application-interface, so that the terminal needs to further determine the intention of the switching operation.

Step 1008, a time interval between two adjacent switching operations is obtained.

For implementations of step 1008, reference may be made to step 607 above, which will not be repeated herein.

Step 1009, when the time interval is greater than an interval threshold or when an interface operation for the first application-interface is received within the time interval, in response to the switching operation, the first application-interface is displayed in the first display mode and the target application-interface is displayed in the second display mode.

Similarly to the step 608 above, the terminal redisplays the first application-interface in the first display mode, and redisplays the target application-interface in the second display mode. When the target application-interface is a full-screen application-interface, the terminal redisplays the target application-interface in full screen, and when the target application-interface is a floating-window application-interface, the terminal redisplays the target application-interface in the second-type floating window.

Step 1010, when the time interval is smaller than the interval threshold and no interface operation for the first application-interface is received within the time interval, a candidate application-interface is determined from the second application-interface other than the target application-interface, and in response to the switching operation, display modes are restored, and then the candidate application-interface is displayed in the first display mode and the first application-interface is displayed in the second display mode.

Similarly to the step 609 above, the terminal cancels the response for the last switching operation, and switches between the display modes of the first application-interface and the candidate application-interface.

Figure 11:
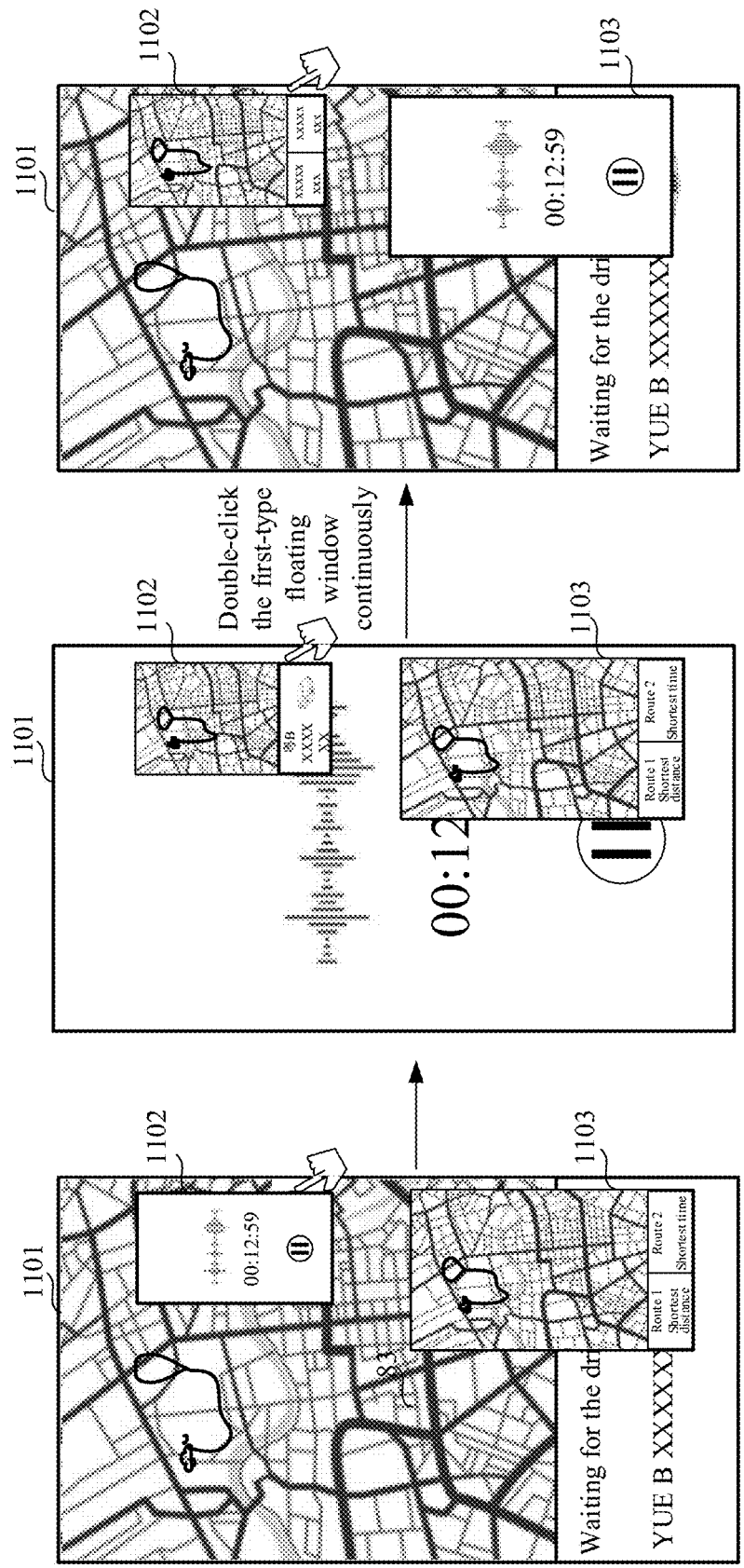
FIG. 11 is a schematic diagram illustrating interfaces during display-mode switching in another example implementation of the method for display-mode switching illustrated in FIG. 10.

In an example, as illustrated in FIG. 11, the terminal displays a full-screen application 1101, a first-type floating window 1102, and a second-type floating window 1103, where the full-screen application 1101 is a ride-hailing application, a recording interface of a recording application is displayed in the first-type floating window 1102, and a navigation interface of the navigation application is displayed in the second-type floating window 1103. When receiving a double-click operation on the first-type floating window 1102, the terminal determines the full-screen application 1101 as the target application, thereby displaying the ride-hailing interface in the first-type floating window 1102 and displaying the recording interface in full-screen. Since the user expects to display the recording application in the second-type floating window 1103, the user double-clicks the first-type floating window 1102 again. After receiving the interface switching operation, the terminal cancels the response to the last switching operation, and displays the recording interface in the second-type floating window 1103 and displays the navigation interface in the first-type floating window 1102.

Figure 12:
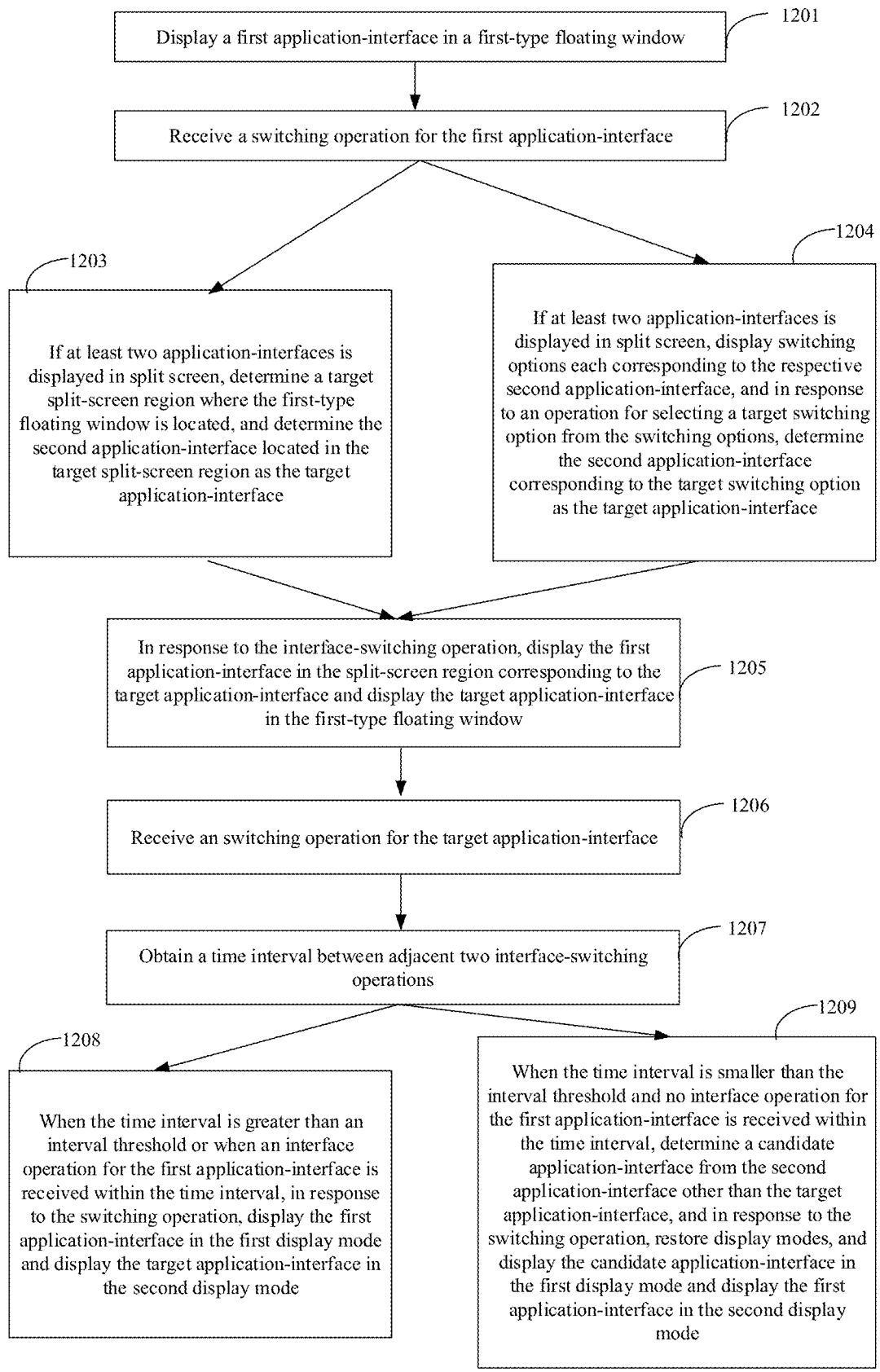
FIG. 12 is a flowchart of a method for display-mode switching provided in another example implementation of the disclosure.

Referring to FIG. 12, FIG. 12 is a flowchart of a method for display-mode switching provided in another example implementation of the disclosure. The method may include the following.

Step 1201, a first application-interface is displayed in a first-type floating window.

Step 1202, a switching operation for the first application-interface is received.

For implementations of steps 1201 and 1202, reference may be made to steps 201 and 202, which will not be repeated herein.

Step 1203, if at least two second application-interfaces are displayed in split screen, a target split-screen region where the first-type floating window is located is determined, and the second application-interface located in the target split-screen region is determined as the target application-interface.

Usually, when a split-screen function is enabled, the user usually moves the floating window to a split-screen region with low concern, so as to avoid the floating window from blocking a split-screen region with high concern. Therefore, in a possible implementation, when at least two split-screen applications and a first-type floating window are displayed, and the switching operation for the first-type floating window is received, the terminal obtains a current display region of the first-type floating window, so as to determine the target split-screen region where the first-type floating window is located according to the current display region and the range of each split-screen region, and then determine the second application-interface located in the target split-screen region as the target application-interface. An intersection of the first-type floating window and the target split-screen region is larger than an intersection of the first-type floating window and each of other split-screen regions.

In another possible implementation, in order to prevent the first-type floating window from obscuring the first application-interface after interface switching, the terminal determines a split-screen region other than the split-screen region where the first-type floating window is located as the target split-screen region.

Figure 13:
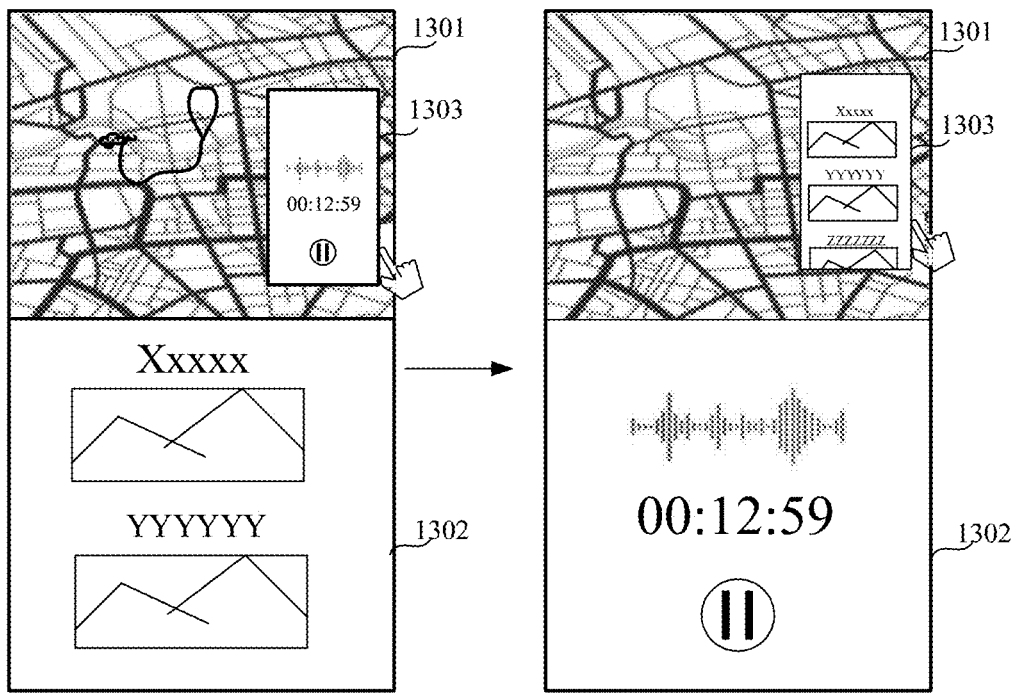
FIG. 13 is a schematic diagram illustrating interfaces during display-mode switching in another example implementation of the method for display-mode switching illustrated in FIG. 12.

Exemplarily, as illustrated in FIG. 13, the terminal displays a first split-screen application 1301 and a second split-screen application 1302 in split screen, and displays a recording application in the first-type floating window 1303. The first split-screen application 1301 is a ride-hailing application, and the second split-screen application 1302 is a news application. When receiving a double-click operation on the first-type floating window 1303, since the first-type floating window 1303 is displayed in the split-screen region corresponding to the first split-screen application 1301, the terminal determines the split-screen region corresponding to the second split-screen application 1302 as the target split-screen region, so as to avoid blocking the recording interface after subsequent interface switching.

Step 1204, if at least two second application-interfaces are displayed in split screen, switching options each corresponding to the respective second application-interface is displayed, and in response to a selecting operation for a target switching option in the switching options, the second application-interface corresponding to the target switching option is determined as the target application-interface.

In order to further improve an accuracy of application-switching, in another possible implementation, when the switching operation is received and the at least two split-screen applications are displayed, the terminal displays switching options each corresponding to a split-screen application (corresponding to the second application-interface). The switching options may be displayed at an edge of the first-type floating window, and the switching options may be in the form of a control such as a button. The form and position of the displayed switching option are not limited in implementations of the disclosure.

Correspondingly, when receiving an operation for selecting the target switching option from the at least two switching options, the terminal determines the split-screen application corresponding to the target switching option as the target application. Correspondingly, the second application-interface corresponding to the target application is the target application-interface.

In addition to the above manners, the terminal may also determine the split-screen region with the largest size as the target split-screen region according to the sizes of the split-screen regions. The terminal may also determine the target application according to a historical application-switching record between the first application and each split-screen application. The split-screen application with the highest frequency of switching with the first application in the historical application-switching record is determined as the target application. Optionally, the split-screen application associated with the first application is determined as the target application. Optionally, according to a latest usage moment of each split-screen application, the split-screen application most recently-used may be determined as the target application. The manner of determining the target application is not limited herein.

Step 1205, in response to the switching operation, the first application-interface is displayed in the split-screen region corresponding to the target application-interface and the target application-interface is displayed in the first-type floating window.

Exemplarily, as illustrated in FIG. 13, the terminal displays the recording interface in the original split-screen region corresponding to the second split-screen application 1302, and displays the news-reading interface in the first-type floating window 1303.

It should be noted that, in this implementation, the first application exemplarily supports to be displayed in split screen. If the first application cannot be displayed in split screen, the terminal will not respond to the switching operation.

Step 1206, a switching operation for the target application-interface is received.

Step 1207, a time interval between two adjacent switching operations is obtained.

Similar to the foregoing implementations, since there are at least two split-screen applications, the terminal needs to further determine an intention of the switching operation.

Step 1208, when the time interval is greater than an interval threshold or when an interface operation for the first application-interface is received within the time interval, in response to the switching operation, the first application-interface is displayed in the first display mode and the target application-interface is displayed in the second display mode.

Similar to the above implementations, when the switching operation is intended to restore the original display modes, the terminal redisplays the first application-interface in the first-type floating window, and redisplays the target application-interface in the original split-screen region of the target application-interface.

Step 1209, when the time interval is smaller than the interval threshold and no interface operation for the first application-interface is received within the time interval, a candidate application-interface is determined from the second application-interface other than the target application-interface, and in response to the switching operation, display modes are restored, and the candidate application-interface is displayed in the first display mode and the first application-interface is displayed in the second display mode.

Similar to the above implementations, when the switching operation is intended to reselect a split-screen application for switching, the terminal cancels the last response to the switching operation, displays the first application-interface in the split-screen region corresponding to the candidate application-interface, and displays the candidate application-interface in the first-type floating window.

It should be noted that the above-mentioned implementations only take the above four cases as examples. In other possible cases (such as displaying at least two split-screen applications and at least one floating-window application), the terminal achieves interface switching with reference to the above principles, which will not be repeated herein.

Figure 14:
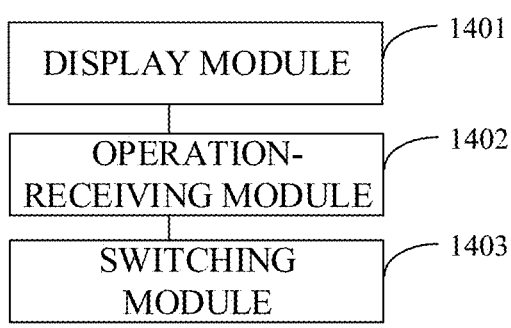
FIG. 14 is a schematic block diagram of an apparatus for display-mode switching provided in one implementation of the disclosure.

Referring to FIG. 14, FIG. 14 is a schematic block diagram of an apparatus for display-mode switching provided in one implementation of the disclosure. The apparatus can be implemented as all or a part of a terminal through software, hardware or a combination thereof. The apparatus includes a display module 1401, an operation-receiving module 1402, and a switching module 1403.

The display module 1401 is configured to display a first application-interface in a first display mode.

The operation-receiving module 1402 is configured to receive a switching operation for the first application-interface, where the switching operation indicates switching a display mode of an application-interface.

The switching module 1403 is configured to: if a second application-interface is displayed in a second display mode, in response to the switching operation, display the second application-interface in the first display mode and display the first application-interface in the second display mode, where an application-interface displayed in the first display mode has a smaller size than an application-interface displayed in the second display mode.

Optionally, the switching module 1403 includes an application-determining unit and a switching unit. The application-determining unit is configured to determine, if at least two second application-interfaces are displayed in the second display mode, a target application-interface from the at least two second application-interfaces. The switching unit configured to display the target application-interface in the first display mode and display the first application-interface in the second display mode, in response to the switching operation.

Optionally, the first display mode is a first floating-window mode, and the second display mode includes at least one of a full-screen mode, a second floating-window mode, or a split-screen mode. In the first floating-window mode, an application-interface is displayed in a first-type floating window, and in the second floating-window mode, an application-interface is displayed in a second-type floating window, where the first-type floating window has a size smaller than the second-type floating window.

Optionally, the second display mode is the full-screen mode. The application-determining unit is configured to determine a second application-interface displayed in full screen as the target application-interface. The switching unit is configured to display the first application-interface in full screen and display the target application-interface in the first-type floating window.

Optionally, the second display mode is the second floating-window mode. The application-determining unit is configured to: obtain a latest usage moment of an application in each second-type floating window; determine a second-type floating window corresponding to a latest usage moment closest to a current time as a target second-type floating window; and determine the second application-interface displayed in the target second-type floating window as the target application-interface. Or the application-determining unit is configured to: display a switching option corresponding to each second-type floating window; in response to an operation for selecting a target switching option in at least two switching options, determine the second-type floating window corresponding to the target switching option as a target second-type floating window; and determine the second application-interface displayed in the target second-type floating window as the target application-interface. The switching unit is configured to: display the first application-interface in the target second-type floating window and display the target application-interface in the first-type floating window.

Optionally, the second display mode comprises the full-screen mode and the second floating-window mode. The application-determining unit is configured to: determine the second application-interface displayed in full screen as the target application-interface; or display a switching option corresponding to each second application-interface, and in response to a selecting operation for a target switching option in the switching options, determine the second application-interface corresponding to the target switching option as the target application-interface. The switching unit is configured to: in response to the target application-interface being the second application-interface displayed in full screen, display the first application-interface in full screen and displaying the target application-interface in the first-type floating window; and in response to the target application-interface being the second application-interface displayed in the second floating-window mode, display the first application-interface in the second-type floating window and display the target application-interface in the first-type floating window.

Optionally, the second display mode is the split-screen mode. The application-determining unit is configured to: determine a target split-screen region where the first-type floating window is located; and determine the second application-interface located in the target split-screen region as the target application-interface. Or the application-determining unit is configured to: display a switching option corresponding to each second-type floating window; in response to an operation for selecting a target switching option from at least two switching options, determine the second-type floating window corresponding to the target switching option as a target second-type floating window; and determine the second application-interface displayed in the target second-type floating window as the target application-interface. The switching unit is configured to display the first application-interface in the target second-type floating window and display the target application-interface in the first-type floating window.

Optionally, the operation-receiving module 1402 is configured to receive a switching operation for the target application-interface. The apparatus further comprises a restoring module configured to in response to the switching operation, display the first application-interface in the first display mode and display the target application-interface in the second display mode, if there is no second application-interface other than the target application-interface.

Optionally, the apparatus further includes an interval-obtaining module configured to obtain a time interval between adjacent two switching operations if there is a second application-interface other than the target application-interface. The restoring module is further configured to when the time interval is greater than an interval threshold or when an interface operation for the first application-interface is received within the time interval, in response to the switching operation, display the first application-interface in the first display mode and display the target application-interface in the second display mode. The switching module 1403 is further configured to when the time interval is smaller than the interval threshold and no interface operation for the first application-interface is received within the time interval, determining a candidate application-interface from the second application-interface other than the target application-interface, and in response to the switching operation, restore the display modes, and display the candidate application-interface in the first display mode and display the first application-interface in the second display mode.

In summary, in implementations of the disclosure, when a first application-interface is displayed, if there is a second application-interface with a larger size and displayed in a different display mode from the first application-interface, the user may trigger the terminal to switch the display modes of the first and second application-interfaces, by performing the switching operation on the first application-interface, so that the user can continue to view content of the second application-interface while viewing the first application-interface in a larger display region, which helps to improve the efficiency of switching between applications in a multi-application usage scenario.

Figure 15:
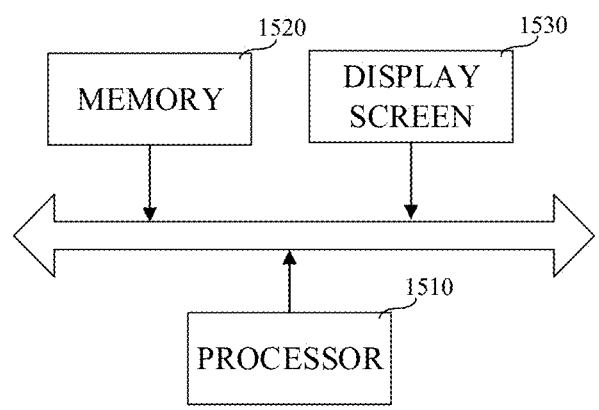
FIG. 15 is a schematic block diagram of a terminal provided in one implementation of the disclosure.

Referring to FIG. 15, FIG. 15 is a schematic block diagram of a terminal provided in one implementation of the disclosure. The terminal in this disclosure may include one or more of the following components: a processor 1510 and a memory 1520.

The processor 1510 may include one or more processing cores. The processor 1510 uses various interfaces and lines to connect various parts in the terminal, and executes various functions of the terminal and processes data by running or executing instructions, programs, code sets or instruction sets stored in the memory 1520 and calling data stored in the memory 1520. Optionally, the processor 1510 may employ at least one hardware form of a digital signal processing (DSP), a field-programmable gate array (FPGA), and a programmable logic array (PLA). The processor 1510 may integrate one or more of a central processing unit (CPU), a graphics processing unit (GPU), a neural-network processing unit (NPU), a modem, and the like. The CPU mainly handles the operating system, user interface, and applications. The GPU is used to render and draw the content that needs to be displayed on the touch screen. The NPU is used to implement artificial intelligence (AI) functions. The modem is used to process wireless communication. It can be understood that, the above-mentioned modem may not be integrated into the processor 1510, and can be implemented by a single chip.

The memory 1520 may include a random access memory (RAM), or may include a read-only memory (ROM). Optionally, the memory 1520 includes a non-transitory computer-readable storage medium. The memory 1520 may be used to store instructions, programs, codes, sets of codes, or sets of instructions. The memory 1520 may include a stored-program area and a stored-data area, where the stored-program area may store instructions for implementing an operating system, instructions for at least one function (such as a touch function, a sound playback function, an image playback function, etc.), instructions for implementing the various method implementations, and the like. The storage-data area may store data (such as audio data, phone book) and the like created according to the use of the terminal.

The terminal in implementations of the disclosure further includes a display screen 1530. The display screen 1530 is used for image display, which may be a full screen, a special-shaped screen, a curved screen, a folding screen, or a double-sided screen, which is not limited herein. In addition, the display screen 1530 may also have a touch function, and the user may perform touch operations on elements in the interface with a finger or a stylus.

In addition, those skilled in the art can understand that the structure of the terminal illustrated in the drawings does not constitute a limitation on the terminal, and the terminal may include more or less components than illustrated, or combine certain components, or have a different component arrangement. For example, the terminal also includes components such as a radio frequency (RF) circuit, an input unit, a sensor, an audio circuit, a speaker, a microphone, and a power supply, which will not be repeated herein.

A computer-readable storage medium is further provided in implementations of the disclosure. The computer-readable storage medium stores at least one instruction, where the at least one instruction is configured to be executed by a processor to carry out the method of the above aspect.

A computer program product or a computer program is further provided in implementations of the disclosure. The computer program product or the computer program includes computer instructions stored in a computer-readable storage medium. A processor of a computer device reads the computer instructions from the computer-readable storage medium and processes the computer instructions to cause a computer device to carry out the method of the above aspect.

Those skilled in the art should realize that, in one or more of the above examples, the functions described in implementations of the disclosure may be implemented by hardware, software, firmware, or any combination thereof. When implemented in software, the functions may be stored on or transmitted over as one or more instructions or code on a computer-readable medium. The computer-readable medium includes both a computer storage medium and communication medium including any medium that facilitates transfer of a computer program from one place to another. A storage medium can be any available medium that can be accessed by a general purpose or special purpose computer.

The above descriptions are only optional implementations of the disclosure, and are not intended to limit the present disclosure. Any modifications, equivalent replacements, improvements, etc. made within the spirit and principles of the present disclosure shall be included in the protection range of the present disclosure.

What is claimed is:
1. A method for display-mode switching, comprising:
displaying a first application-interface in a first display mode and displaying a second application-interface in a second display mode;

receiving a switching operation for the first application-interface, the switching operation indicating switching a display mode of an application-interface; and in response to the switching operation, switching the second application-interface directly from the second display mode to the first display mode and simultaneously switching the first application-interface directly from the first display mode to the second display mode, wherein an application-interface displayed in the first display mode has a smaller size than an application-interface displayed in the second display mode;

wherein the second application-interface comprises at least two second application-interfaces, and in response to the switching operation, switching the second application-interface directly from the second display mode to the first display mode and simultaneously switching the first application-interface directly from the first display mode to the second display mode comprises:

determining a target application-interface from the at least two second application-interfaces; and in response to the switching operation, switching the target application-interface directly from the second display mode to the first display mode and simultaneously switching the first application-interface directly from the first display mode to the second display mode.

2. The method of claim 1, wherein the first display mode is a first floating-window mode, and the second display mode comprises at least one of a full-screen mode, a second floating-window mode, or a split-screen mode, and in the first floating-window mode, an application-interface is displayed in a first-type floating window, and in the second floating-window mode, an application-interface is displayed in a second-type floating window, wherein the first-type floating window has a size smaller than the second-type floating window.

3. The method of claim 1, wherein the first display mode is a first floating-window mode, and the second display mode is a full-screen mode, and in the first floating-window mode, an application-interface is displayed in a first-type floating window.

4. The method of claim 2, wherein the second display mode is the second floating-window mode, and determining the target application-interface from the at least two second application-interfaces comprises:

obtaining a latest usage moment of an application in each second-type floating window;

determining a second-type floating window corresponding to a latest usage moment closest to a current time as a target second-type floating window; and determining the second application-interface displayed in the target second-type floating window as the target application-interface; or displaying at least two switching options each corresponding to a second-type floating window;

in response to an operation of selecting a target switching option from the at least two switching options, determining a second-type floating window corresponding to the target switching option as a target second-type floating window; and determining the second application-interface displayed in the target second-type floating window as the target application-interface; and switching the second application-interface directly from the second display mode to the first display mode and simultaneously switching the first application-interface directly from the first display mode to the second display mode comprises:

displaying the first application-interface in the target second-type floating window and displaying the target application-interface in the first-type floating window.

5. The method of claim 2, wherein the second display mode comprises the full-screen mode and the second floating-window mode, and determining the target application-interface from the at least two second application-interfaces comprises:

determining the second application-interface displayed in full screen as the target application-interface; or displaying at least two switching options each corresponding to a second application-interface, and in response to a selecting operation for a target switching option in the at least two switching options, determining the second application-interface corresponding to the target switching option as the target application-interface; and switching the second application-interface directly from the second display mode to the first display mode and simultaneously switching the first application-interface directly from the first display mode to the second display mode comprises:

in response to the target application-interface being the second application-interface displayed in full screen, displaying the first application-interface in full screen and displaying the target application-interface in the first-type floating window; and in response to the target application-interface being the second application-interface displayed in the second floating-window mode, displaying the first application-interface in the second-type floating window and displaying the target application-interface in the first-type floating window.

6. The method of claim 2, wherein the second display mode is the split-screen mode, and determining the target application-interface from the at least two second application-interfaces comprises:

determining a target split-screen region where the first-type floating window is located; and determining the second application-interface located in the target split-screen region as the target application-interface; or displaying at least two switching options each corresponding to a second application-interface, and in response to a selecting operation for a target switching option in the at least two switching options, determining the second application-interface corresponding to the target switching option as the target application-interface; and switching the second application-interface directly from the second display mode to the first display mode and simultaneously switching the first application-interface directly from the first display mode to the second display mode comprises:

displaying the first application-interface in a split-screen region corresponding to the target application-interface and displaying the target application-interface in the first-type floating window.

7. The method of claim 1, wherein after switching the target application-interface directly from the second display mode to the first display mode and simultaneously switching the first application-interface directly from the first display mode to the second display mode, the method further comprises:
receiving a switching operation for the target application-interface; and
in response to the switching operation, displaying the first application-interface in the first display mode and displaying the target application-interface in the second display mode, wherein there is no second application-interface other than the target application-interface.

8. The method of claim 1, wherein after receiving the switching operation for the target application-interface, the method further comprises:
receiving a switching operation for the target application-interface; and
obtaining a time interval between adjacent two switching operations, wherein there is at least one second application-interface other than the target application-interface;
when the time interval is greater than an interval threshold or when an interface operation for the first application-interface is received within the time interval, in response to the switching operation, displaying the first application-interface in the first display mode and displaying the target application-interface in the second display mode; and
when the time interval is smaller than the interval threshold and no interface operation for the first application-interface is received within the time interval, determining a candidate application-interface from the at least one second application-interface other than the target application-interface, and in response to the switching operation, restoring the display modes, and displaying the candidate application-interface in the first display mode and displaying the first application-interface in the second display mode.

9. A terminal, comprising a processor and a memory storing at least one instruction which, when executed by the processor, causes the processor to:
display a first application-interface in a first display mode and display a second application-interface in a second display mode;
receive a switching operation for the first application-interface, the switching operation indicating switching a display mode of an application-interface; and
in response to the switching operation, switch the second application-interface directly from the second display mode to the first display mode and simultaneously switch the first application-interface directly from the first display mode to the second display mode, wherein an application-interface displayed in the first display mode has a smaller size than an application-interface displayed in the second display mode;
wherein the second application-interface comprises at least two second application-interfaces, and the at least one instruction executed by the processor to switch the second application-interface directly from the second display mode to the first display mode and simultaneously switch the first application-interface directly from the first display mode to the second display mode is executed by the processor to:
determine a target application-interface from the at least two second application-interfaces; and
in response to the switching operation, switch the target application-interface directly from the second display mode to the first display mode and simultaneously switch the first application-interface directly from the first display mode to the second display mode.

10. The terminal of claim 9, wherein the first display mode is a first floating-window mode, and the second display mode comprises at least one of a full-screen mode, a second floating-window mode, or a split-screen mode, and
in the first floating-window mode, an application-interface is displayed in a first-type floating window, and in the second floating-window mode, an application-interface is displayed in a second-type floating window, wherein the first-type floating window has a size smaller than the second-type floating window.

11. The terminal of claim 9, wherein the first display mode is a first floating-window mode, and the second display mode is a full-screen mode, and
in the first floating-window mode, an application-interface is displayed in a first-type floating window.

12. The terminal of claim 10, wherein the second display mode is the second floating-window mode, and
the at least one instruction executed by the processor to determine the target application-interface from the at least two second application-interfaces is executed by the processor to:
obtain a latest usage moment of an application in each second-type floating window;
determine a second-type floating window corresponding to a latest usage moment closest to a current time as a target second-type floating window; and
determine the second application-interface displayed in the target second-type floating window as the target application-interface; or
display at least two switching options each corresponding to a second-type floating window;
in response to an operation of selecting a target switching option from the at least two switching options, determine a second-type floating window corresponding to the target switching option as a target second-type floating window; and
determine the second application-interface displayed in the target second-type floating window as the target application-interface; and
the at least one instruction executed by the processor to switch the second application-interface directly from the second display mode to the first display mode and simultaneously switch the first application-interface directly from the first display mode to the second display mode is executed by the processor to:
display the first application-interface in the target second-type floating window and display the target application-interface in the first-type floating window.

13. The terminal of claim 10, wherein the second display mode comprises the full-screen mode and the second floating-window mode, and
the at least one instruction executed by the processor to determine the target application-interface from the at least two second application-interfaces is executed by the processor to:
determine the second application-interface displayed in full screen as the target application-interface; or
display at least two switching options each corresponding to a second application-interface, and in response to a selecting operation for a target switching option in the at least two switching options, determine the second application-interface corresponding to the target switching option as the target application-interface; and the at least one instruction executed by the processor to switch the second application-interface directly from the second display mode to the first display mode and simultaneously switch the first application-interface directly from the first display mode to the second display mode is executed by the processor to:
  in response to the target application-interface being the second application-interface displayed in full screen, display the first application-interface in full screen and display the target application-interface in the first-type floating window; and
  in response to the target application-interface being the second application-interface displayed in the second floating-window mode, display the first application-interface in the second-type floating window and display the target application-interface in the first-type floating window.

14. The terminal of claim 10, wherein the second display mode is the split-screen mode, and the at least one instruction executed by the processor to determine the target application-interface from the at least two second application-interfaces is executed by the processor to:
  determine a target split-screen region where the first-type floating window is located; and
  determine the second application-interface located in the target split-screen region as the target application-interface; or
  display at least two switching options each corresponding to a second application-interface, and in response to a selecting operation for a target switching option in the at least two switching options, determine the second application-interface corresponding to the target switching option as the target application-interface; and the at least one instruction executed by the processor to switch the second application-interface directly from the second display mode to the first display mode and simultaneously switch the first application-interface directly from the first display mode to the second display mode is executed by the processor to:
  display the first application-interface in a split-screen region corresponding to the target application-interface and display the target application-interface in the first-type floating window.

15. The terminal of claim 9, wherein the at least one instruction is further executed by the processor to:
  receive a switching operation for the target application-interface; and
  in response to the switching operation, display the first application-interface in the first display mode and display the target application-interface in the second display mode, wherein there is no second application-interface other than the target application-interface.

16. The terminal of claim 9, wherein the at least one instruction is further executed by the processor to:
  receive a switching operation for the target application-interface; and
  obtain a time interval between adjacent two switching operations, wherein there is at least one second application-interface other than the target application-interface;
  when the time interval is greater than an interval threshold or when an interface operation for the first application-interface is received within the time interval, in response to the switching operation, display the first application-interface in the first display mode and display the target application-interface in the second display mode; and
  when the time interval is smaller than the interval threshold and no interface operation for the first application-interface is received within the time interval, determine a candidate application-interface from the at least one second application-interface other than the target application-interface, and in response to the switching operation, restore the display modes, and display the candidate application-interface in the first display mode and display the first application-interface in the second display mode.

17. A non-transitory computer-readable storage medium storing at least one instruction which, when executed by a processor, causes the processor to:
  display a first application-interface in a first display mode and display a second application-interface in a second display mode;
  receive a switching operation for the first application-interface, the switching operation indicating switching a display mode of an application-interface; and
  in response to the switching operation, switch the second application-interface directly from the second display mode to the first display mode and simultaneously switch the first application-interface directly from the first display mode to the second display mode, wherein an application-interface displayed in the first display mode has a smaller size than an application-interface displayed in the second display mode;
  wherein the second application-interface comprises at least two second application-interfaces, and the at least one instruction executed by the processor to switch the second application-interface directly from the second display mode to the first display mode and simultaneously switch the first application-interface directly from the first display mode to the second display mode is executed by the processor to:
  determine a target application-interface from the at least two second application-interfaces; and
  in response to the switching operation, switch the target application-interface directly from the second display mode to the first display mode and simultaneously switch the first application-interface directly from the first display mode to the second display mode.

18. The non-transitory computer-readable storage medium of claim 17, wherein the first display mode is a first floating-window mode, and the second display mode comprises at least one of a full-screen mode, a second floating-window mode, or a split-screen mode, and
  in the first floating-window mode, an application-interface is displayed in a first-type floating window, and in the second floating-window mode, an application-interface is displayed in a second-type floating window, wherein the first-type floating window has a size smaller than the second-type floating window.

19. The non-transitory computer-readable storage medium of claim 18, wherein the second display mode is the split-screen mode, and
  the at least one instruction executed by the processor to determine the target application-interface from the at least two second application-interfaces is executed by the processor to:
  determine a target split-screen region where the first-type floating window is located; and determine the second application-interface located in the target split-screen region as the target application-interface; or display at least two switching options each corresponding to a second application-interface, and in response to a selecting operation for a target switching option in the at least two switching options, determine the second application-interface corresponding to the target switching option as the target application-interface; and the at least one instruction executed by the processor to switch the second application-interface directly from the second display mode to the first display mode and simultaneously switch the first application-interface directly from the first display mode to the second display mode is executed by the processor to:

display the first application-interface in a split-screen region corresponding to the target application-interface and display the target application-interface in the first-type floating window.

20. The non-transitory computer-readable storage medium of claim 17, wherein the at least one instruction is further executed by the processor to:

receive a switching operation for the target application-interface; and obtain a time interval between adjacent two switching operations, wherein there is at least one second application-interface other than the target application-interface;

when the time interval is greater than an interval threshold or when an interface operation for the first application-interface is received within the time interval, in response to the switching operation, display the first application-interface in the first display mode and display the target application-interface in the second display mode; and when the time interval is smaller than the interval threshold and no interface operation for the first application-interface is received within the time interval, determine a candidate application-interface from the at least one second application-interface other than the target application-interface, and in response to the switching operation, restore the display modes, and display the candidate application-interface in the first display mode and display the first application-interface in the second display mode.

* * * * *